United States Patent [19]

Yamazaki et al.

[11] Patent Number: 4,511,213
[45] Date of Patent: Apr. 16, 1985

[54] CODING METHOD FOR MULTILEVEL-GRADATED PICTURE SIGNAL

[75] Inventors: Yasuhiro Yamazaki, Hiratsuka; Toshiaki Endo, Tanashi, both of Japan

[73] Assignee: Kokusai Denshin Denwa Kabushiki Kaisha, Tokyo, Japan

[21] Appl. No.: 449,186

[22] Filed: Dec. 13, 1982

[30] Foreign Application Priority Data

Dec. 24, 1981 [JP] Japan ............................. 56-212624
Feb. 12, 1982 [JP] Japan ............................. 57-19767

[51] Int. Cl.³ .............................................. H04N 1/00
[52] U.S. Cl. .................................. 358/261; 358/260
[58] Field of Search ............................... 358/260, 261

[56] References Cited

U.S. PATENT DOCUMENTS

| | | | |
|---|---|---|---|
| 3,967,052 | 6/1976 | Judice | 358/261 |
| 4,245,257 | 1/1981 | Yamazaki et al. | 358/260 |
| 4,258,392 | 3/1981 | Yamazaki et al. | 358/261 |
| 4,420,771 | 12/1983 | Pirsch | 358/261 |

Primary Examiner—Howard W. Britton
Assistant Examiner—John K. Peng
Attorney, Agent, or Firm—Robert E. Burns; Emmanuel J. Lobato; Bruce L. Adams

[57] ABSTRACT

A coding method for a multilevel-gradated picture signal is disclosed, in that a series of binary codes obtained by processing a multilevel-gradated original picture signal for binary representation are segmented every predetermined number n of picture elements on each scanning line to form blocks, respectively capable of assuming value "0" to "$2n-1$"; and the value of a block having changed its value and its position on the scanning line are encoded so as to be reproduced on the reproducing side.

7 Claims, 22 Drawing Figures

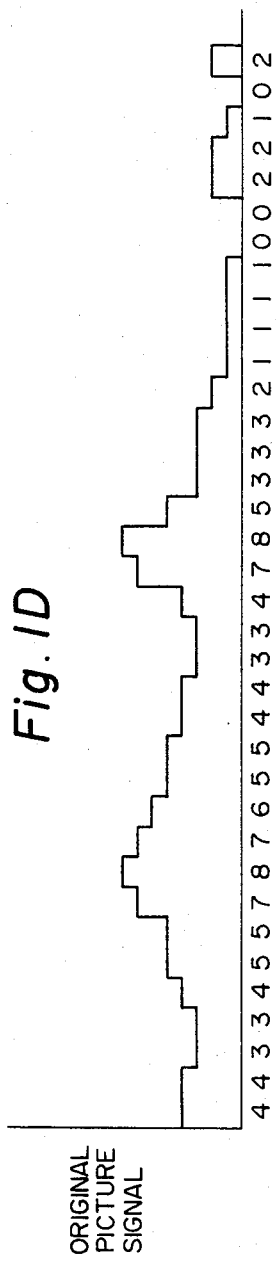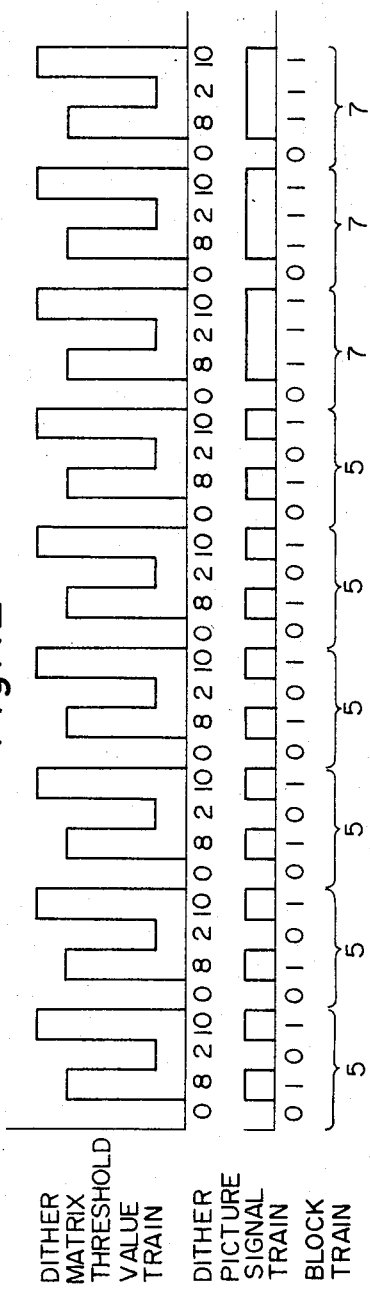

Fig. 2A

| Lr | 7 | 7 | 7 | 7 | 7 | 5 | 5 | 3 | 3 | 5 | 5 | 5 | 7 | |
|----|---|---|---|---|---|---|---|---|---|---|---|---|---|---|
| Lc | 15| 15| 7 | 7 | 7 | 7 | 7 | 3 | 3 | 3 | 3 | 6 | 6 | |

$b_1$ above column 6; $a_0$ below column 3; $a_1$ below column 8.

Fig. 3A

| Lr | 7 | 7 | 7 | 5 | 5 | 5 | 5 | 3 | 3 | 5 | 5 | 5 | 7 | |
|----|---|---|---|---|---|---|---|---|---|---|---|---|---|---|
| Lc | 15| 15| 7 | 7 | 7 | 7 | 7 | 3 | 3 | 3 | 3 | 6 | 6 | |

$b_1$ above column 4; $a_0$ below column 3; $a_1$ below column 8.

Fig. 4A

| Lr | 7 | 7 | 5 | 7 | 7 | 7 | 7 | 3 | 3 | 5 | 5 | 5 | 7 | |
|----|---|---|---|---|---|---|---|---|---|---|---|---|---|---|
| Lc | 15| 15| 7 | 7 | 7 | 7 | 7 | 3 | 3 | 3 | 3 | 6 | 6 | |

$b_1$ above column 4; $a_0$ below column 3; $a_1$ below column 8.

Fig. 2B

| Lr | 7 | 7 | 7 | 7 | 7 | 5 | 5 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

$b_1$ above column 6 of Lr. $a_{-1}$, $a_0$ below columns 3, 4 of Lc. $a_1$ below column 8.

Fig. 3B

| Lr | 7 | 7 | 7 | 5 | 5 | 5 | 5 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

| Lr | 7 | 7 | 5 | 7 | 7 | 7 | 7 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

$b_1$, $a_{-1}$, $a_0$, $a_1$

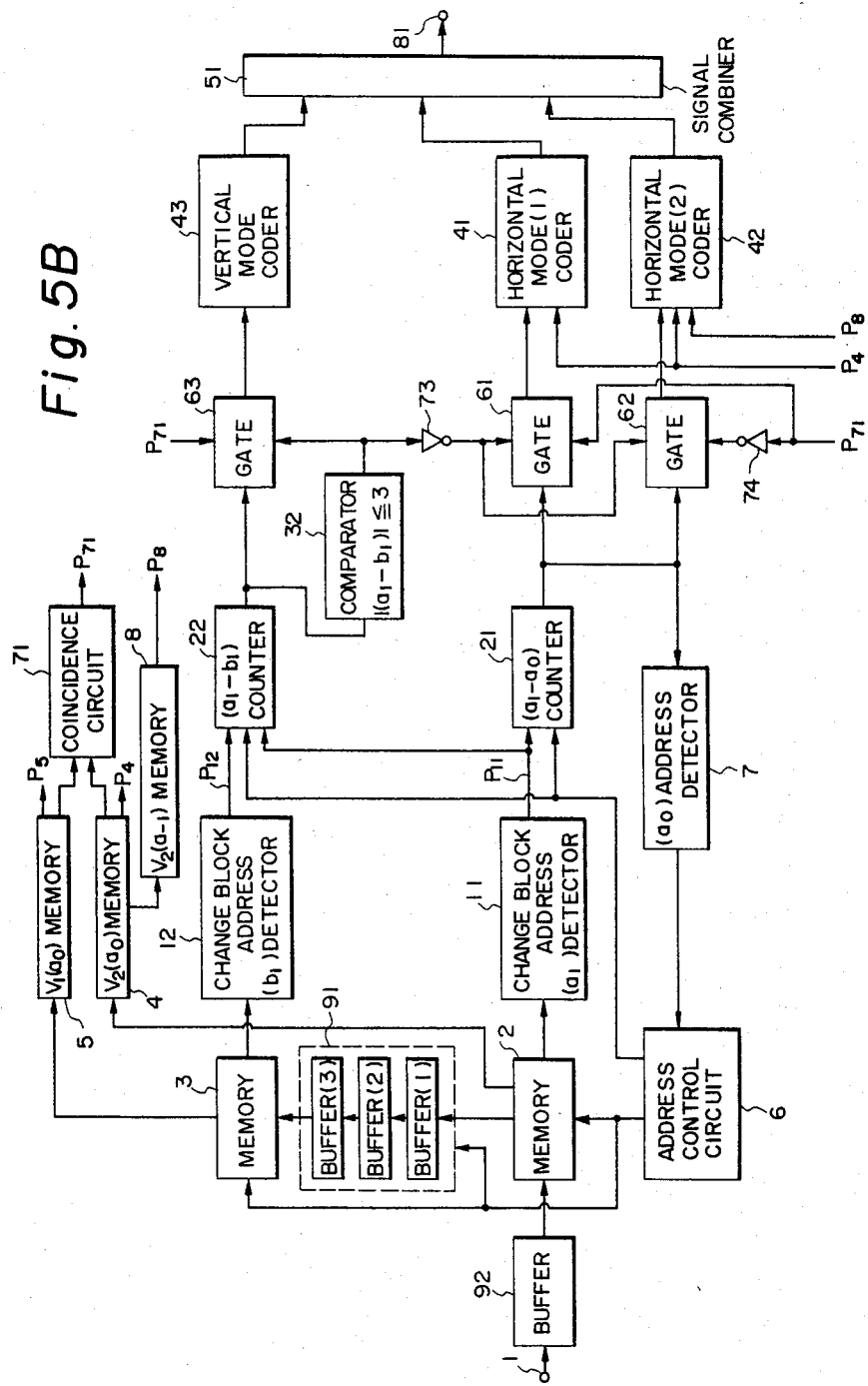

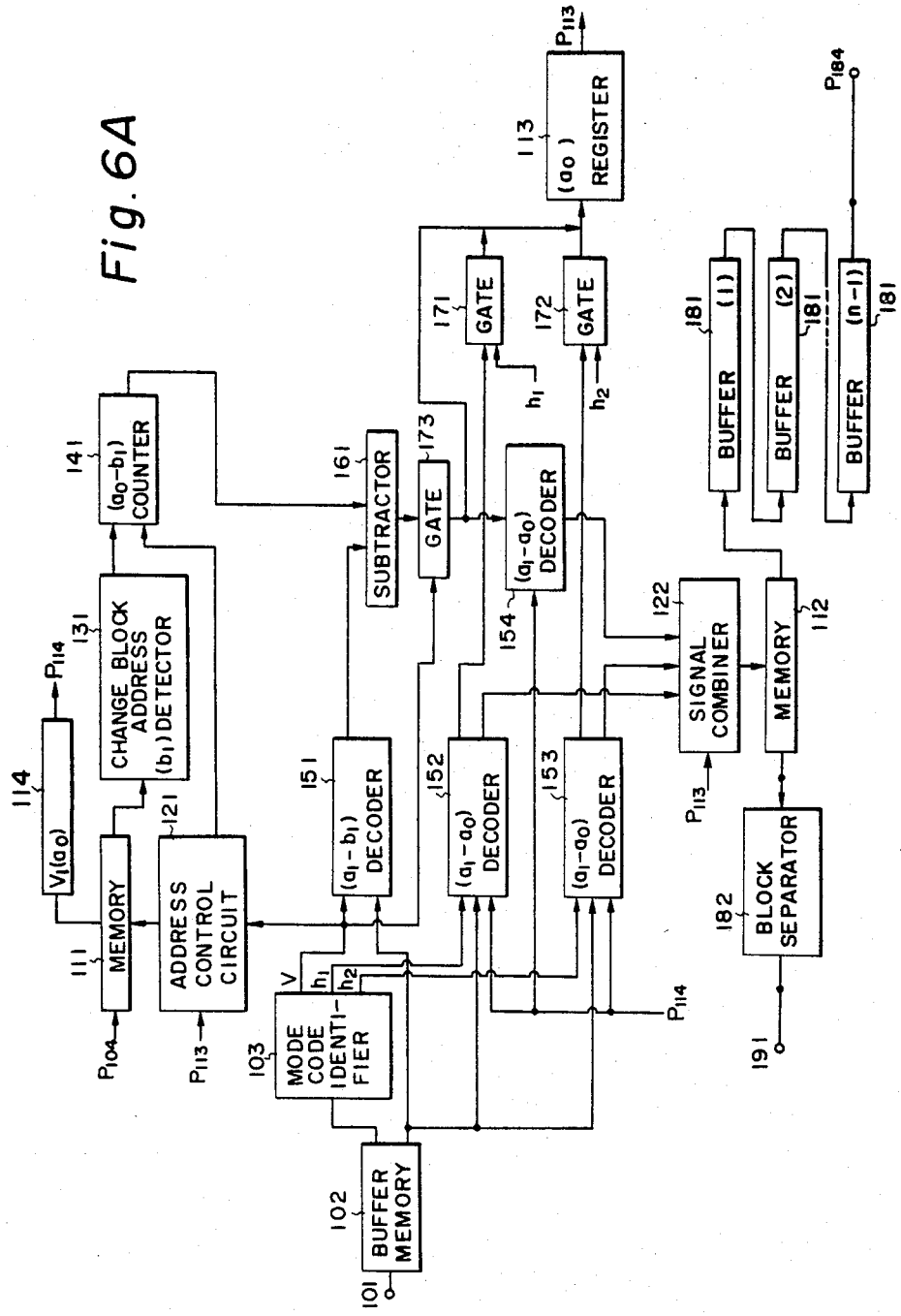

Fig. 7

| Lr | 7 | 7 | 7 | 7 | 7 | 5 | 5 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

$b_1$ above column 6, $b_2$ above column 8
$a_{-1}$, $a_0$ below columns 2, 3; $a_1$ below column 8

Fig. 8

| Lr | 7 | 7 | 5 | 5 | 5 | 7 | 7 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

| Lr | 7 | 7 | 7 | 5 | 5 | 5 | 5 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

| Lr | 7 | 7 | 5 | 7 | 7 | 7 | 7 | 3 | 3 | 5 | 5 | 5 | 7 |
|----|---|---|---|---|---|---|---|---|---|---|---|---|---|
| Lc | 15 | 15 | 7 | 7 | 7 | 7 | 7 | 3 | 3 | 3 | 3 | 6 | 6 |

$b_1$, $b_2$; $a_{-1}$, $a_0$, $a_1$

CODING METHOD FOR MULTILEVEL-GRADATED PICTURE SIGNAL

BACKGROUND OF THE INVENTION

The present invention relates to a coding system which is effective for efficient transmission or storage of a multilevel-gradated/facsimile signal.

One method that has been employed for representing a multilevel-gradated picture as of a photograph in a shaded form by the binary terms is an ordered dither method. This is a method which represents the degree of shading of the picture in terms of the area ratio between black picture elements and white picture elements.

On the other hand, Modified Read (MR) coding system is standardized by the International Telegraph and Telephone consultative Committee (CCITT). According to this system, when an information change picture element (which is a picture element having changed from white to black or vice versa and will hereinafter be referred to as a "change picture element") is coded, its address relative to a preceding change picture element on the same scanning line or on a preceding scanning line is coded. This system achieves a high compression rate of a two-level facsimile signal. In case of coding the aforesaid dither picture by this system, however, a high compression rate cannot be expected because the dither picture has an appreciably large number of change picture elements as compared with the two-level facsimile signal.

BRIEF SUMMARY OF THE INVENTION

It is therefore an object of the present invention to provide a coding method for a multilevel-gradated picture which achieves a high compression rate for a multilevel-gradated facsimile signal, such as the dithered picture, and permits the reduction of the transmission time and the storage capacity for such facsimile signal.

In accordance with the present invention, there is provided a coding method for a multilevel-gradated picture signal, characterized in that a series of binary codes obtained by processing a multilevel-gradated original picture signal for binary representation are segmented every predetermined number n of picture elements on each scanning line to form blocks, respectively capable of assuming value "0" to "$2^n - 1$"; and the value of a block having changed its value and its position on the scanning line are encoded so as to be reproduced on the reproducing side.

BRIEF DESCRIPTION OF THE DRAWINGS

The present invention will be described in detail below with reference to the accompanying drawings, in which:

FIGS. 1A to 1F are diagrams showing the principles of a systematic dither method and coding for use in the present invention;

FIGS. 2A, 3A and 4A are diagrams explanatory of specific examples of coding;

FIG. 6A is a block diagram illustrating an example of coding apparatus for decoding a train of codes encoded by the present invention;

FIGS. 2B, 3B, 4B, 7, 8, 9 and 10 are diagrams explanatory of specific examples of coding;

FIG. 5B is a block diagram illustrating an embodiment of the coding system of the present invention;

DETAILED DESCRIPTION

Figure 5A:
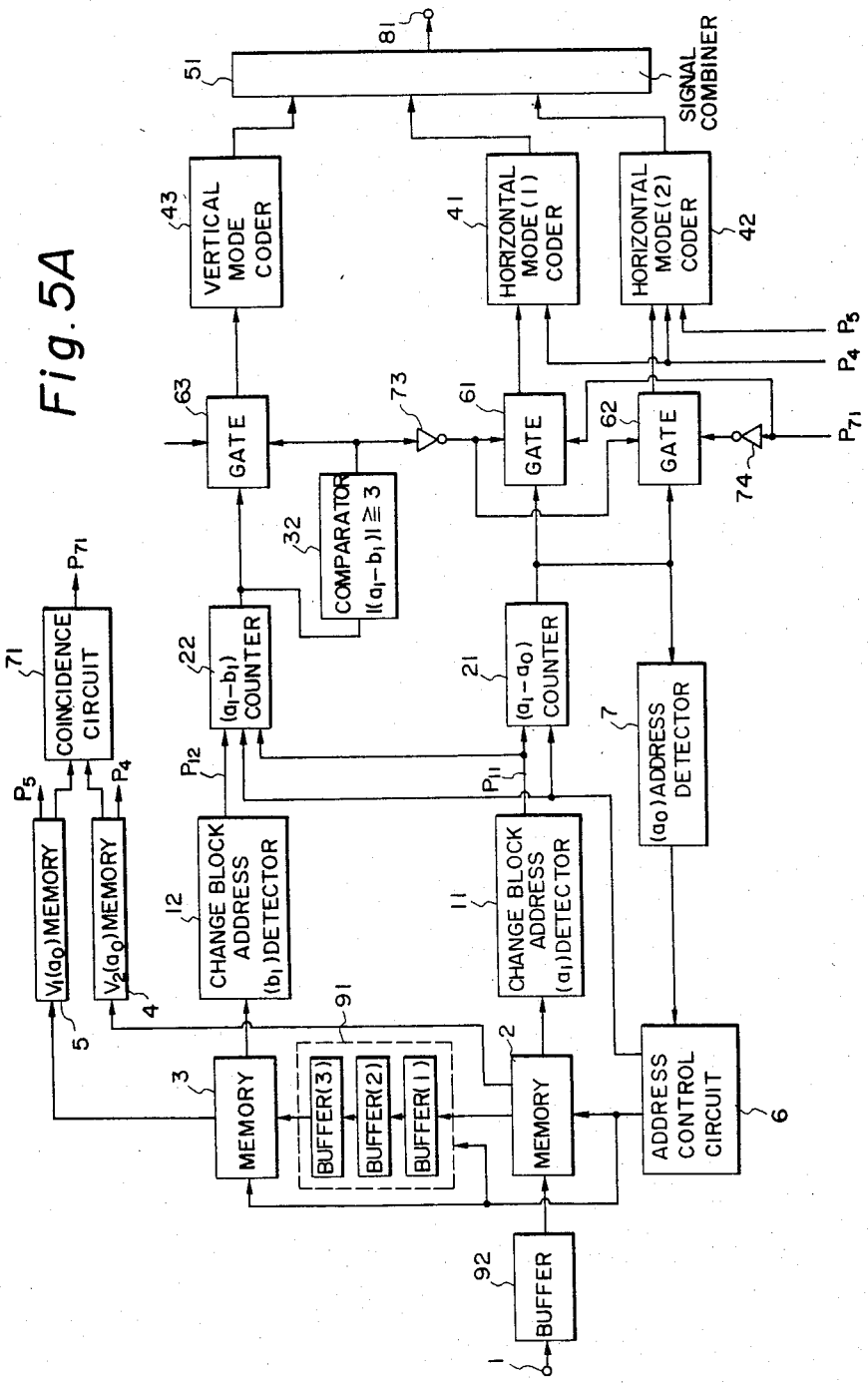
FIGS 5A is a block diagram illustrating an embodiment of the present invention.

According to the present invention, for instance, in case of the binary representation of a multilevel gradated picture through using a 4×4 dither matrix, picture elements on each scanning line are sequentially grouped together by steps of four, noting that the periodicity of threshold values developes every four picture elements, and the groups are each regarded as one block having one of possible values $2^4$ (respective values of blocks described later) and, on the series of blocks in the direction of the scanning line, the address and the value of a change block are coded.

Figures 1A, 1B, 1C:
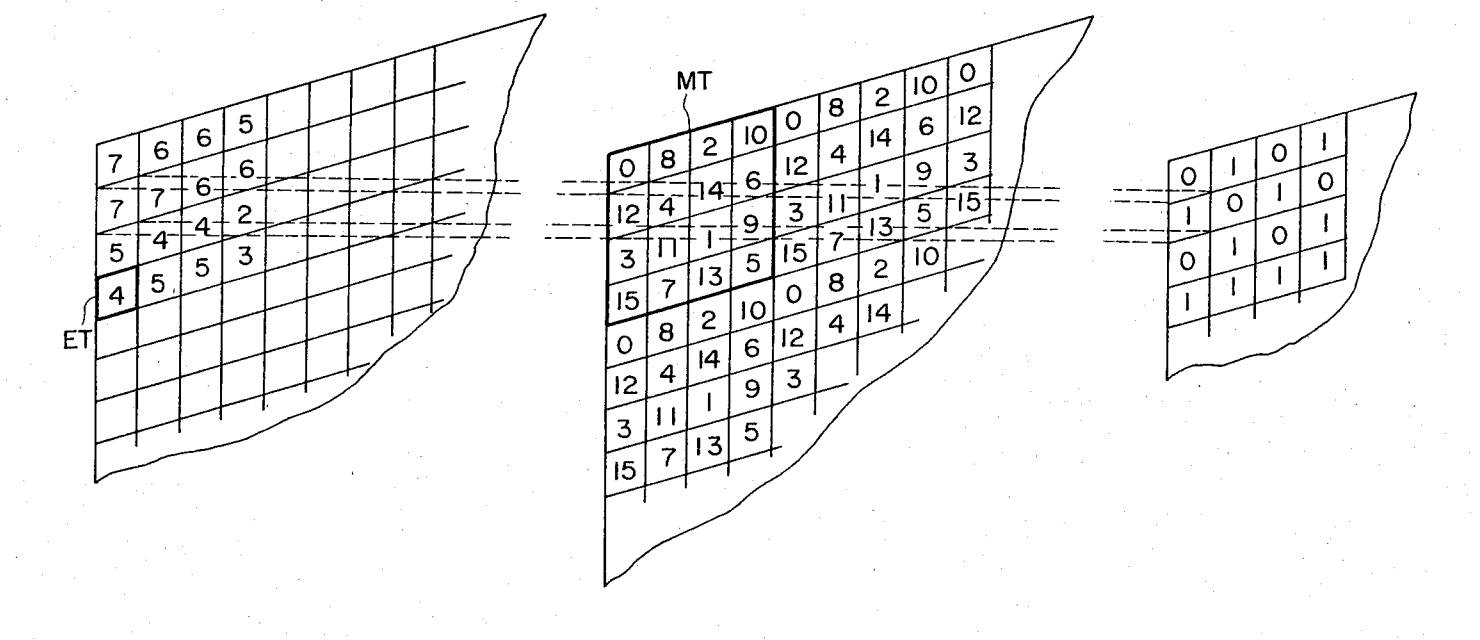

FIGS. 1A to 1F shows its principle. FIGS. 1A, 1B and 1C respectively show the picture element level of each picture element ET of an input picture, its threshold value and a binary representation of the picture. According to this method, in the case where a certain picture has, for example, 16-level gradations (0 to 15), 16 threshold values 0 to 15 are distributed in a 4×4 matrix MT called a dither matrix, for instance, in accordance with a certain rule based on a Bayer model or spiral type model as indicated by the thick line in FIG. 1B. Such dither matrices are arranged side by side in vertical and lateral directions and threshold values are determined for all picture elements of the multilevel-gradated picture. The level of each picture element and the threshold value therefor are compared with each other and the picture element is represented as black (a signal "1") or white (a signal "0") depending on whether the threshold value is larger than the level of the picture element or not, thereby providing a binary representation of the picture. For instance, a picture element on the second row and the first column in the input picture shown in FIG. 1A has a value 7 and a threshold value at the same positions in FIG. 1B is 12; therefore, the corresponding picture element on the second row and the first column in the binary-represented picture goes to a "1" (black). The binary-represented picture obtained by this method is called a dithered picture.

For example, by the binary representation of such an original picture signal train as shown in FIG. 1D through using such a dither matrix threshold value train as depicted in FIG. 1E, there can be obtained such a dither picture signal train as shown in FIG. 1F. When coding this dither picture signal train, as it is, by such a conventional coding system as the modified Read system, a high compression rate cannot be expected because it contains a large number of change picture elements. However, by grouping the picture elements into blocks, each consisting of four picture elements, to form a train of blocks along the scanning line as shown in FIG. 1F, the number of information change blocks (hereinafter referred to as change blocks), each having a value different from that of the immediately preceding block on the block train, markedly decreases as compared with the number of change picture elements. For instance, in the case of FIG. 1F, the number of change picture elements is 30 and the number of change blocks after the blocking is one. Therefore, the coding of the block train obtained by the blocking of the dither picture signal train is far more efficient than the coding of the dither picture signal train by such a conventional system as the modified Read system. For coding the train of blocks, however, it is necessary to encode the position and the value of each change block and, consequently, the conventional coding systems cannot be applied directly to the coding therefor. Then, the following several systems can be considered for efficient coding of the train of blocks:

(1) In case of coding the value and the position of the change block, the value of the change block and its position from a scanning start point are coded. Heretofore, a system of coding the position of the change picture element from the scanning start point has been proposed as a system for coding a binary facsimile signal; with this system, however, a high compression rate cannot be expected since the dither picture signal has many change picture elements. Nevertheless, the use of the abovesaid coding system permits more efficient coding.

(2) In case of coding the value and the position of the change block, the lengths (the run lengths) of blocks having the same value in succession are obtained, and this run lengths and their values are coded. In the past, there has been employed, as a binary facsimile signal coding system, a system of coding the position of the change block in terms of the run length as in Modified Huffman system standardized by the CCITT but, with this system, a high compression rate is unobtainable because the dithered picture signal contains many change picture elements. However, more efficient coding can be achieved through utilization of the abovesaid coding system.

FIGS. 2A, 3A and 4A are explanatory of specific examples of coding, each small frame showing a block newly obtained by grouping together binary picture elements and the value in the frame showing the value of the block. Let it be assumed here that each block has possible values of 16 levels (0 to 15). First, addresses $a_0$, $a_1$ and $b_1$ of change blocks are defined as follows: (See FIG. 2A)

$a_0$: Address of a starting block on a coding line with which coding starts.

$a_1$: Address of a change block which occurs after the block of the address $a_0$ on the coding line.

$b_1$: Address of a change block which occurs on a reference line after a block of the position just above the block of the address $a_0$.

For the sake of brevity, $V_1(a_0)$ and $V_2(a_0)$ and $(y-z)$ are defined as follows:

$V_1(a_0)$: Value of a block on the reference line just above the block of the address $a_0$.

$V_2(a_0)$: Value of a block at the position of the address $a_0$ on the coding line.

$y=z$: Address of y relative to the address of z.

In this case, y and z may assume the values of the addresses $a_0$, $a_1$ and $b_1$.

The address and the value of each change block on the coding line are coded in the following procedures:

(a) The addresses $a_1$ and $b_1$ of the change blocks are obtained.

(b) In case of $|a_1-b_1| \leq 3$ and $V_1(a_0)=V_2(a_0)$ (see FIG. 2A):

When this condition holds, it is determined to perform the coding in a vertical mode and code words are allocated according to the value of $a_1-b_1$. For instance, in such a case as shown in FIG. 2A, since $a_1-b_1=2$, the block is coded into "000011" as shown in Table 1.

(c) In case of the condition of (b) being not satisfied:

Any one of coding modes is selected under the following conditions.

(c-1) In case of $V_1(a_0)=V_2(a_0)$ (see FIG. 3A):

When this condition holds, it is determined to carry out coding the block in a horizontal mode 1, and the block is coded by using code words indicating this mode and code words $D_{v1(a0)}(a_1-a_0)$ indicating a run length $a_1-a_0$. For example, in such a case as shown in FIG. 3A, the mode code words indicating the horizontal mode 1 are "0001" as shown in Table 1 and the code words indicating the run length $a_1-a_0$ is "111011" as shown in Table 2; therefore, the block is coded into "0001111011".

(c-2) In case of $V_1(a_0) \neq V_2(a_0)$ (see FIG. 4A):

When this condition holds, it is determined to perform coding the block in a horizontal mode 2, and the block is coded by using code words indicating this mode, code words $P_{v1(a0)}(V_2(a_0))$ indicating the value of $V_2(a_0)$ and code words $D_{v2(a0)}(a_1-a_0)$ indicating the run length $a_1-a_0$. For example, in such a case as shown in FIG. 4A, the code words indicating the horizontal mode 2 are "001" as shown in Table 1, the code words indicating the value of $V_1(a_0)$ are "110" as shown in Table 3 and the code words indicating the run length $a_1-a_0$ are "111011" as shown in Table 2; consequently, it is coded into "001110111011".

(d) The block of the address $a_0$ is shifted to the address $a_1$.

The coding takes place in accordance with the abovesaid procedure starting with the start picture element of the coding line.

The above is illustrative of several examples of coding operations. The present invention is not limited specifically thereto but may be applied to any coding which permits the reproduction of the value of the change block and its position on each scanning line with regardless of whether it is one-dimensional coding scheme or two-dimensional coding scheme.

According to the present invention, the coding is carried out assuming, as a critical condition, that a terminating block of each line is virtually followed by a change block although this does not restrict the gist of the present invention.

TABLE 1

| Mode | Element to be coded | | Code |
|---|---|---|---|
| Vertical mode | $\|a_1 - b_1\| \leq 3$ and $V_1(a_0) = V_2(a_0)$ | $a_1 - b_1 = -3$ | 0000010 |
| | | $a_1 - b_1 = -2$ | 000010 |
| | | $a_1 - b_1 = -1$ | 010 |
| | | $a_1 - b_1 = 0$ | 1 |
| | | $a_1 - b_1 = 1$ | 011 |
| | | $a_1 - b_1 = 2$ | 000011 |
| | | $a_1 - b_1 = 3$ | 0000011 |

TABLE 1-continued

| Mode | Element to be coded | | Code |
| --- | --- | --- | --- |
| Horizontal mode 1 | In the case of coding in vertical mode being impossible | $V_1(a_0) = V_2(a_0)$ | $0001 + D_{v1(a0)}(a_1 - a_0)$ |
| Horizontal mode | | $V_1(a_0) \neq V_2(a_0)$ | $001 + P_{v1(a0)}(V_2(a_0)) + D_{v2(a0)}(a_1 - a_0)$ |

TABLE 2

| $a_1 - a_0$ | $D_0(a_1 - a_0)$ | | $D_6(a_1 - a_0)$ | $D_7(a_1 - a_0)$ | | $D_{15}(a_1 - a_0)$ |
| --- | --- | --- | --- | --- | --- | --- |
| 0 | 00 | ... | 0 | 0 | ... | 0 |
| 1 | 010 | ... | 10 | 10 | ... | 100 |
| 2 | 011 | ... | 110 | 110 | ... | 1010 |
| 3 | 10000 | ... | 1110 | 11110 | ... | 1011 |
| 4 | 10001 | ... | 1110 | 11111 | ... | 110000 |
| 5 | 100100 | ... | 11110 | 111011 | ... | 110001 |
| . | . | . | . | . | . | . |
| . | . | . | . | . | . | . |

TABLE 3

| $V_2(a_0)$ | $P_0(V_2(a_0))$ | | $P_5(V_2(a_0))$ | | $P_{15}(V_2(a_0))$ |
| --- | --- | --- | --- | --- | --- |
| 0 | — | --- | 00 | --- | 010 |
| 1 | 000 | --- | 01 | --- | 11110 |
| 2 | 01000 | --- | 1111110 | --- | 1100 |
| 3 | 01001 | --- | 11111110 | --- | 100 |
| 4 | 001 | --- | 10 | --- | 1111110 |
| . | . | | . | | . |
| . | . | --- | . | --- | . |
| 7 | 01010 | --- | 110 | --- | 11101 |
| . | . | | . | | . |
| . | . | --- | . | --- | . |
| 14 | 0110 | --- | 111111110 | --- | 001 |
| 15 | 01110 | --- | 1110 | --- | — |

A description will be given of an example of apparatus for achieving the principle of the present invention.

FIG. 5A illustrates, by way of example, a coding apparatus. Reference numeral 1 indicates a two-level facsimile signal input terminal; 2 and 3 designate memories for storing signals of one scanning line (hereinafter referred to as a "line"), respectively, the memory 2 storing information of a coding line and the memory 3 storing information of a reference line; 4 identifies a memory for one block which stores the value $V_2(a_0)$ of a starting block on the coding line; 5 denotes a memory for one block which stores the value $V_1(a_0)$ of a starting block on the reference line; 6 represents an address control circuit for controlling an operation of reading out the contents of the coding line memory 2 and the reference line memory 3 on a blockwise basis; 7 shows an address register indicating the position of the address $a_0$; 11 and 12 refer to a change block address $a_1$ detector and a change block address $b_1$ detector for detecting the change block addresses from the information of the coding line and the information of the reference line; 21 and 22 signify counters for counting the values $(a_1-a_0)$ and $(b_1-a_1)$, respectively; 32 indicates a comparator for comparing the absolute value of the content of the counter 22 with a predetermined threshold value; 41, 42 and 43 designate coders corresponding to the horizontal mode 1, the horizontal mode 2 and the vertical mode, respectively; 51 identifies a signal combiner; 61, 62 and 63 denote gates; 71 represents a coincidence circuit for detecting coincidence between the values $V_1(a_0)$ and $V_2(a_0)$; 73 and 74 show NOT circuits; 81 refers to an output terminal; 91 signifies a line buffer; and 92 indicates a block forming buffer.

The storage capacity of the line buffer 91 in this embodiment is determined depending on which one of the lines preceding the coding line is selected as the reference line. In this embodiment the line which has the highest correlation to the coding line is shown to be a fourth one of the lines preceding it, and the storage capacity of the line buffer 91 is prepared for three lines.

For the sake of simplicity, a memory shift pulse circuit and timing clock pulses, which are not related directly to the circuit operation in this embodiment, are omitted.

Next, a detailed description will be given of the arrangement and the operation of this embodiment. The contents of the coding line are applied from the terminal 1 to the block forming buffer 92, wherein they are consolidated into blocks, and they are stored in the line memory 2 in a sequential order. At this time, the coded contents of the previous line stored in the line memory 2 are transferred to a line buffer (1) for storage therein and the contents transferred from the line buffer (1) and stored before in a line memory (2) are transferred to a line buffer (3) for storage therein and, further, the contents stored before in the line buffer (3) are transferred to the reference line memory 3 for storage therein. Furthermore, at this time, the address $a_0$ of the coding start point on the coding line is stored in the $a_0$ address register 7 and the address $a_0$ is also set as an initial value in the address control circuit 6. Consequently, the values $V_1(a_0)$ and $V_2(a_0)$ are read out from the line memory 2 and the reference line memory 3, respectively, and stored in the $V_1(a_0)$ and $V_2(a_0)$ memories 5 and 4. The contents of the line memory 2 and the reference line memory 3 are simultaneously read out, block by block, by the count-up operation of the address control circuit 6 in a sequential order starting with the address $a_0$. The change block address $a_1$ detector 11 compares the block value transferred from the line memory 2 with the block value transferred therefrom immediately before and provides an output of "0" or "1" on a line $P_{11}$ depending on whether they are equal to each other or not. The coincidence circuit 71 compares the contents of the $V_2(a_0)$ memory 4 and the $V_1(a_0)$ memory 5 with each other and provides an output of "1" or "0" on a line $P_{71}$ depending on whether they are equal to each other or not. The change block address $b_1$ detector 12 compares the block value received from the reference line memory 3 with the block value received therefrom immediately before and provides an output of "0" or "1" on a line $P_{12}$ depending on whether they are equal to each other or not. The $(a_1-b_1)$ counter 22 is provided to count a distance between the change block addresses $a_1$ and $b_1$ and starts the counting operation by an earlier one of the signals on the lines $P_{11}$ and $P_{12}$ and stops the counting operation by the other signal applied afterwards. At this time, if the signal on the line $P_{12}$ is applied earlier, the counted contents of the counter 22 are incremented one by one in synchronism with signals from the address control circuit 6 and, if the signal on the line $P_{11}$ is applied earlier, the counted contents of the counter 22 are decremented one by one. By this, the distance between the addresses $a_1$ and $b_1$ is obtained with a sign (±). Incidentally, when signals "1" are concurrently applied from the lines $P_{11}$ and $P_{12}$, the counter 22 generates an output of "0" as the value of $(a_1-b_1)$. The comparator 32 tests whether or not the absolute value $|(a_1-b_1)|$ of the contents of the $(a_1-b_1)$ counter 22 is smaller than "3", and yields an output of "1" or "0" depending on whether the absolute value falls inside the abovesaid range or not. The gate 63 is opened by the signals from the line $P_{71}$ and the comparator 32. That is to say, it is opened when the conditions $V_1(a_0)=V_2(a_0)$ and $|a_1-b_1|\leq 3$ are fulfilled so that the contents of the $(a_1-b_1)$ counter 22 are coded by the vertical mode coder 43.

The $(a_1-a_0)$ counter 21 starts its counting operation at the time of the address control circuit 6 setting therein the address $a_0$ and increments its contents one by one receiving signals from the address control circuit 6 and stops the counting at the time when it receives the signal "1" from the line $P_{11}$. The gate 61 is opened when the output from the comparator 32 assumes the state "0" and the signal on the line $P_{71}$ assumes the state "1", that is, when $V_1(a_0)=V_2(a_0)$ and $|(a_1-b_1)|>3$. This is the condition for the horizontal mode (1). The horizontal mode (1) coder 41 codes the value of $(a_1-a_0)$ provided thereto via the gate 61 on the basis of the value $V_2(a_0)$ applied via the line P.

The gate 62 is opened when the comparator 32 produces an output of "0" and the signal on the line $P_{71}$ assumes the state "0", that is, when the mode of operation is the horizontal mode (2) in which $V_1(a_0)\neq V_2(a_0)$ and $|(a_1-b_1)|>3$. The horizontal mode (2) coder 42 encodes the value $(a_1-a_0)$ applied thereto via the gate 62 and the value $V_2(a_0)$ from the line $P_4$ on the basis of the value $V_1(a_0)$ from the line $P_5$. The signal combiner 51 combines the encoded signals from the coders 41, 42 and 43 into a train of signals, which are provided to the output terminal 81. The $a_0$ address register 7 receives the contents of the $(a_1-a_0)$ counter 21 and adds the value $(a_1-a_0)$ to its contents to obtain a new address $a_0$.

In the foregoing, for the sake of brevity, reset conditions of the counters and the detectors are not referred to nor shown in the drawings. Let it be assumed that the change block address detectors 11 and 12 and the counters 21 and 22 are reset upon each new setting of the address $a_0$.

The above is a description of the operation of the coding apparatus, and decoding is carried out by reversing the order of the operations described above. FIG. 6A illustrates an example of a decoding circuitry. Reference numeral 101 indicates a coded signal input terminal; 102 designates an input buffer memory; 103 identifies a mode code identifier; 111 and 112 denote a decoding line memory and a reference line memory, respectively; 113 represents an $a_0$ register; 114 shows a $V_1(a_0)$ memory; 121 refers to an address control circuit; 122 signifies a signal combiner; 131 indicates a change block address $b_1$ detector; 141 designates a $(a_0-b_1)$ counter; 151, 152 and 153 identify decoders respectively corresponding to the vertical mode, the horizontal mode (1) and the horizontal mode (2); 161 denotes a subtractor; 171, 172, 173 and 174 represent gate circuits; 181 shows line buffers; 182 refers to a block separator; and 191 signifies an output terminal. The number of the line buffers 181 prepared is the same as the number of the line buffers 91 used in the coding apparatus. For convenience of description, a memory shift pulse circuit and timing clock pulses, which are not related directly to the circuit operation, are not shown.

Next, a detailed description will be given of the arrangement and the operation of this embodiment. The encoded signals of one line provided from the input terminal 101 are once loaded in the input buffer memory 102. At this time, the decoded contents stored in the decoding line memory 112 are transferred to and stored in a line buffer (1) of 181 and, at the same time, it is converted by the block separator 182 into a binary signal for output from the output terminal 191. Furthermore, at this time, the contents stored in the line buffers (1) to (n−2) of 181 are respectively transferred to and stored in the next stage line buffers and the contents stored in the line buffer (n−1) are transferred to the reference line memory 111 for storage therein.

The mode code identifier 103 reads out a required number of signals from the input buffer memory 102 and decides, from their code words, which one of the vertical mode, the horizontal mode (1) and the horizontal mode (2) is being used for decoding. When the signals are "0001", the mode code identifier 103 decides that the decoding mode is the horizontal mode (1), and provides an output "1" on a line $h_1$; when the signals are "001", it decides that the decoding mode is the horizontal mode (2), and provides an output of "1" on a line $h_2$; and when the signals are "0000010", "000010", "010", "1", "011", "000011" or "0000011", it decides that the decoding mode is the vertical mode, and provides an output of "1" on a line V. The address control circuit 121, when receiving the signal "1" from the line V, applies pulses to the reference line memory 111 so that it shifts its stored contents of individual blocks from the address $a_0$ received from a line $P_{113}$ and outputs them, block by block, to the change block address $b_1$ detector 131. The $V_1(a_0)$ memory 114 is a memory having a storage capacity of one block and loads thereinto the value $V_1(a_0)$ from the reference line memory 111 when the address $a_0$ is set in the address control circuit 121. The change block address $b_1$ detector 131 compares the block value received from the reference line memory 111 and the block value received therefrom immediately before it, and produces a signal "0" or "1" depending on whether they are equal to each other or not. The $a_0-b_1$ counter 141 increments its counted contents by one upon each reception of a signal from the address control circuit 121 after the time of the address control circuit 121 receiving the signal "1" from the line V, and, upon reception of the signal "1" from the change block address $b_1$ detector 131, the counter 141 stops the incremental counting operation and outputs its counted contents "$a_0-b_1$" to the subtractor 161. The $a_1-b_1$ decoder 151, when supplied with the signal "1" from the line V, obtains an address of $a_1$ for $b_1$ from the signal received from the input buffer memory 102 and provides the thus obtained address to the subtractor 161. The subtractor 161 subtracts the output "$a_0-b_1$" of the $a_0-b_1$ counter 141 from the output "$a_1-b_1$" of the $a_1-b_1$ decoder 151 to obtain the address of $a_1$ for $a_0$, "$a_1-a_0$", and provides it to the gate 173. The gate 173 is opened by the signal "1" from the line V to pass on the signal from the subtractor 161 to the $a_1-a_0$ decoder 154 and the $a_0$ register 113 as well. The $a_1-a_0$ decoder 154 applies a picture element signal from the line $P_{114}$ to the signal combiner 122 by the number of times indicated by the signal received from the gate 173. The $a_1-a_0$ decoder 152, when receiving the signal "1" from the line $h_1$, obtains "$a_1-a_0$" from the signal received from the input buffer memory 102 and the block signal received from the line $P_{114}$, and provides it via the gate 171 to the $a_0$ register 113 and outputs the signal from the input buffer memory 102 to the signal combiner 122 by "$a_1-a_0$" times. The $a_1-a_0$ decoder 153, when supplied with the signal "1" from the line $h_2$, obtains an output of "$a_1-a_0$" and a picture element signal of the address $a_0$ on the coding scanning line from the signal received from the input buffer memory 102 and the signal from the line $P_{114}$, and applies the picture element signal to the signal combiner 122 by "$a_1-a_0$" times and, further, provides via the gate 172 to the $a_0$ register 113 a signal representing the value "$a_1-a_0$". The signal combiner 122 receives the output signals of the decoders 152, 153 and 154 and the signal $P_{113}$ of the $a_0$ register 113, performs decoding between the addresses $a_0$ and $a_1$ and provides the decoded output to the coding line memory 112.

In the abovesaid decoding circuit, the reset conditions of the counters and the detectors are not referred to nor are they illustrated from the sake of simplicity but it is assumed that the change block address $b_1$ detector 131 and the $a_0-a_1$ counter 141 are reset upon each new setting of the address $a_0$.

While in the foregoing the mode codes, the codes indicating the run lengths and the codes indicating the values of blocks are exemplified in Tables 1, 2 and 3, respectively, the system of the present invention is not limited specifically to such codes but may also be applied with other codes.

As has been described in detail in the foregoing, the present invention permits marked enhancement of the coding efficiency noting the periodicity of codes in the case of processing the multilevel-gradated facsimile signal for binary representation, and hence it is of great utility when employed in high quality image processing techniques.

FIGS, 2B, 3B and 4B are explanatory of other specific examples of coding, each small frame showing a block newly obtained by grouping together binary picture elements and the value in the frame showing the value of the block. Let it be assumed here that each block has possible values of 16 levels (0 to 15). First, addresses $a_0$, $a_{-1}$, $a_1$ and $b_1$ of change blocks are defined as follows: (See FIG. 2B.)

$a_0$: Address of a starting block, on a coding line, with which coding starts.

$a_{-1}$: Address of a block immediately preceding the block of the address $a_1$, that is, $a_{-1}=a_0-1$.

$a_1$: Address of a change block which occurs after the block of the address $a_0$ on the coding line.

$b_1$: Address of a change block which occurs on a reference line after a block of the position just above the block of the address $a_0$.

For the sake of brevity, $V_1(x)$ and $V_2(x)$ and $(y-z)$ are defined as follows:

$V_1(x)$: Value of a block on the reference line just above the block of an address x.

$V_2(x)$: Value of a block at the position of the address x on the coding line.

$y-z$: Address of y relative to the address of z. In this case, x, y and z may assume the values of the addresses $a_0$, $a_1$, $a_{-1}$ and $b_1$.

The address and the value of each change block on the coding line are coded the following procedures:

(a) The addresses $a_1$ and $b_1$ of the change blocks are obtained.

(b) In case of $\{|a_1-b_1| \leq 3$ and $V_1(a_0)=V_2(a_0)$ (see FIG. 2):

When this condition holds, it is determined to perform the coding in a vertical mode and code words are allocated according to the value of $a_1-b_1$. For instance, in such a case as shown in FIG. 2B, since $a_1-b_1=2$, the block is coded into "000011" as shown in Table 4.

(c) In case of the condition of (b) being not satisfied:

Any one of coding modes is selected under the following conditions.

(c-1) In case of $V_1(a_0)=V_2(a_0)$ (see FIG. 3B):

When this condition holds, it is determined to carry out coding the block in a horizontal mode 1, and the block is coded by using code words indicating this mode and code words $D_{v1(a_0)}(a_1-a_0)$ indicating a run length $a_1-a_0$. For example, in such a case as shown in FIG. 3B, the mode code words indicating the horizontal mode 1 are "0001" as shown in Table 4 and the code words indicating the run legnth $a_1-a_0$ is "11111" as shown in Table 2; therefore, the block is coded into "000111111".

(c-2) In case of $V_1(a_0) \neq V_2(a_0)$ (see FIG. 4B):

When this condition holds, it is determined to perform coding the block in a horizontal mode 2, and the block is coded by using code words indicating this mode, code words $P_{v2(a_0)}(V_2(a_0))$ indicating the value of $V_2(a_0)$ and code words $D_{v2(a_0)}(a_1-a_0)$ indicating the run length $a_1-a_0$. For example, in such a case as shown in FIG. 4B, the code words indicating the horizontal mode 2 are "001" as shown in Table 1, the code words indicating the value of $V_2(a_0)$ are "11101" as shown in Table 3 and the code words indicating the run length $a_1-a_0$ are "11111" as shown in Table 2; consequently, it is coded into "0011110111111".

TABLE 4

| Mode | Element to be coded | | Code |
|---|---|---|---|
| Vertical mode | $\|a_1 - b_1\| \leq 3$ and $V_1(a_0) = V_2(a_0)$ | $a_1 - b_1 = -3$ | 0000010 |
| | | $a_1 - b_1 = -2$ | 000010 |
| | | $a_1 - b_1 = -1$ | 010 |
| | | $a_1 - b_1 = 0$ | 1 |
| | | $a_1 - b_1 = 1$ | 011 |
| | | $a_1 - b_1 = 2$ | 000011 |
| | | $a_1 - b_1 = 3$ | 0000011 |
| Horizontal mode 1 | In the case of coding in vertical mode being impossible | $V_1(a_0) = V_2(a_0)$ | $0001 + D_{v1(a_0)}(a_1 - a_0)$ |
| Horizontal mode 2 | | $V_1(a_0) \neq V_2(a_0)$ | $001 + P_{v2(a-1)}(V_2(a_0)) + D_{v2(a_0)}(a_1 - a_0)$ |

(d) The block of the address $a_0$ is shifted to the address $a_1$.

The coding takes place in accordance with the above-said procedure starting with the start picture element of the coding line.

According to the present invention, though not defining the essence of the invention, the coding is carried out assuming, as critical conditions, that the coding line at first is preceded immediately by four lines with all block values being "0", that a first block of each line is preceded immediately by a block with the block value "0", and that a terminating block of each line is virtually followed by a change block.

A description will be given of an example of apparatus for achieving the principle of the present invention.

FIG. 5B illustrates, by way of example, a coding apparatus. Reference numeral 1 indicates a two-level facsimile signal input terminal; 2 and 3 designate memories for storing signals of one scanning line (hereinafter referred to as a "line"), respectively, the memory 2 storing information of a coding line and the memory 3 storing information of a reference line; 4 identifies a memory for one block which stores the value $V_2(a_0)$ of a starting block on the coding line; 5 denotes a memory for one block which stores the value $V_1(a_0)$ of a starting block on the reference line; 6 represents an address control circuit for controlling an operation of reading out the contents of the coding line memory 2 and the reference line memory 3 on a blockwise basis; 7 shows an address register indicating the position of the address $a_0$; 8 shows a memory for one block which stores the block value $V_2(a_{-1})$; 11 and 12 refer to a change block address $a_1$ detector and a change block address $b_1$ detector for detecting change block addresses from the information of the coding line and the information of the reference line; 21 and 22 signify counters for counting the values $(a_1 - a_0)$ and $(b_1 - a_1)$, respectively; 32 indicates a comparator for comparing the absolute value of the content of the counter 22 with a predetermined threshold value; 41, 42 and 43 designate coders corresponding to the horizontal mode 1, the horizontal mode 2 and the vertical mode, respectively; 51 identifies a signal combiner; 61, 62 and 63 denote gates; 71 represents a coincidence circuit for detecting coincidence between the values $V_1(a_0)$ and $V_2(a_0)$; 73 and 74 show NOT circuits; 81 refers to an output terminal; 91 signifies a line buffer; and 92 indicates a block forming buffer.

The storage capacity of the line buffer 91 in this embodiment is determined depending on which one of the lines preceding the coding line is selected as the reference line. In this embodiment the line which has the highest correlation to the coding line is shown to be a fourth one of the lines preceding it, and the storage capacity of the line buffer 91 is prepared for three lines.

For the sake of simplicity, a memory shift pulse circuit and timing clock pulses, which are not related directly to the circuit operation in this embodiment, are omitted.

Next, a detailed description will be given by the arrangement and the operation of this embodiment. The contents of the coding line are applied from the terminal 1 to the block forming buffer 92, wherein they are consolidated into blocks, and they are stored in the line memory 2 in a sequential order. At this time, the coded contents of the previous line stored in the line memory 2 are transferred to a line buffer (1) for storage therein and the contents transferred from the line buffer (1) and stored before in a line memory (2) are transferred to a line buffer (3) for storage therein and, further, the contents stored before in the line buffer (3) are transferred to the reference line memory 3 for storage therein. Furthermore, at this time, the address $a_0$ of the coding start point on the coding line is stored in the $a_0$ address register 7 and the address $a_0$ is also set as an initial value in the address control circuit 6. Consequently, the values $V_1(a_0)$ and $V_2(a_0)$ are read out from the line memory 2 and the reference line memory 3, respectively, and stored in the $V_1(a_0)$ and $V_2(a_0)$ memories 5 and 4 and, at the same time, a "0" is stored in the $V_2(a_{-1})$ memory 8. The contents of the line memory 2 and the reference line memory 3 are simultaneously read out, block by block, by the count-up operation of the address control circuit 6 in a sequential order starting with the address $a_0$. The change block address $a_1$ detector 11 compares the block value transferred from the line memory 2 with the block value transferred therefrom immediately before and provides a "0" or "1" on a line $P_{11}$ depending on whether they are equal to each other or not. The coincidence circuit 71 compares the contents of the $V_2(a_0)$ memory 4 and the $V_1(a_0)$ memory 5 with each other and provides an output of "1" or "0" on a line $P_{71}$ depending on whether they are equal to each other or not. The change block address $b_1$ detector 12 compares the block value received from the reference line memory 3 with the block value received therefrom immediately before and provides an output "0" or "1" on a line $P_{12}$ depending on whether they are equal to each other or not. The $(a_1 - b_1)$ counter 22 is provided to count a distance between the change block addresses $a_1$ and $b_1$ and starts the counting operation by an earlier one of the signals on the lines $P_{11}$ and $P_{12}$ and stops the counting operation by the other signal applied afterwards. At this time, if the signal on the line $P_{12}$ is applied earlier, the count contents of the counter 22 are incremented one by one in synchronism with signals from the address control circuit 6 and, if the signal on the line $P_{11}$ is applied earlier, the count contents of the counter 22 are decremented one by one. By this, the distance between the addresses $a_1$ and $b_1$ is obtained with a sign ($\pm$). Incidentally, when signals "1" are concurrently applied from the lines $P_{11}$ and $P_{12}$, the counter 22 generates an output of "0" as the value of $(a_1 - b_1)$. The comparator 32 tests whether or not the absolute value $|(a_1 - b_1)|$ of the contents of the $(a_1 - b_1)$ counter 22 is smaller than "3", and yields an output "1" or "0" depending on whether the absolute value falls inside the abovesaid range or not. The gate 63 is opened by the signals from the line $P_{71}$ and the comparator 32. That is to say, it is opened when the conditions $V_1(a_0) = V_2(a_0)$ and $|a_1 - b_1| \leq 3$ are fulfilled so that the contents of the $(a_1 - b_1)$ counter 22 are coded by the vertical mode coder 43.

The $(a_1 - a_0)$ counter 21 starts its counting operation at the time of the address control circuit 6 setting therein the address $a_0$ and increments its contents one by one receiving signals from the address control circuit 6 and stops the counting at the time when it receives the signal "1" from the line $P_{11}$. The gate 61 is opened when the output from the comparator 32 assumes the state "0" and the signal on the line $P_{71}$ assumes the state "1", that is, when $V_1(a_0) = V_2(a_0)$ and $|(a_1 - b_1)| > 3$. This is the condition for the horizontal mode (1). The horizontal mode (1) coder 41 codes the value of $(a_1 - a_0)$ provided thereto via the gate 61 on the basis of the value $V_2(a_0)$ applied via the line $P_4$.

The gate 62 is opened when the comparator 32 produces an output of "0" and the signal on the line $P_{71}$ assumes the state "0", that is, when the mode of operation is the horizontal mode (2) in which $V_1(a_0) \neq V_2(a_0)$ and $|(a_1-b_1)| > 3$. The horizontal mode (2) coder 42 encodes the value $(a_1-a_0)$ applied thereto via the gate 62 and the value $V_2(a_{-1})$ from a line $P_8$ on the basis of the value $V_2(a_0)$ from the line $P_4$. The signal combiner 51 combines the encoded signals from the coders 41, 42 and 43 into a train of signals, which are provided to the output terminal 81. The $a_0$ address register 7 receives the contents of the $(a_1-a_0)$ counter 21 and adds the value $(a_1-a_0)$ to its contents to obtain a new address $a_0$.

At the same time, the contents of the $V_2(a_0)$ memory 4 are stored in the $V_2(a_{-1})$ memory 8, and the values $V_1(a_0)$ and $V_2(a_0)$ are read out from the line memories 2 and 3, and stored in the $V_1(a_0)$ and $V_2(a_0)$ memories 5 and 4, respectively.

In the foregoing, for the sake of brevity, reset conditions of the counters and the detectors are not referred to nor are they shown in the drawings. Let it be assumed that the change block address detectors 11 and 12 and the counters 21 and 22 are reset upon each new setting of the address $a_0$.

Figure 6B:
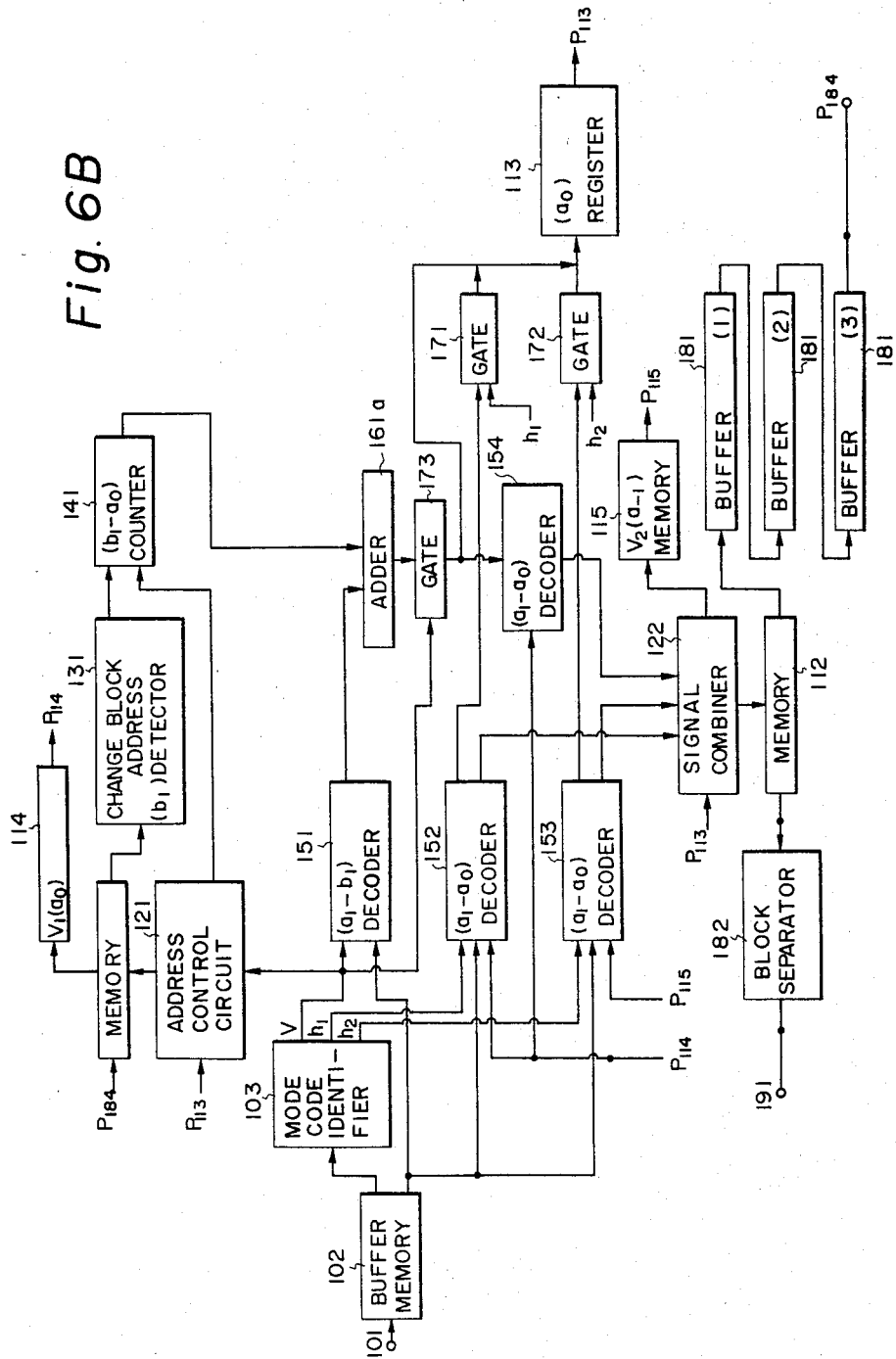
FIG. 6B is a block diagram illustrating an example of a decoding apparatus for a facsimile signal coded by the embodiment of FIG. 5B.

The above is a description of the operation of the coding apparatus, and decoding is carried out by reversing the order of the operations described above. FIG. 6B illustrates an example of a decoding circuitry. Reference numeral 101 indicates a coded signal input terminal; 102 designates an input buffer memory; 103 identifies a mode code identifier; 111 and 112 denote a decoding line memory and a reference line memory, respectively; 113 represents an $a_0$ register; 114 shows a $V_1(a_0)$ memory; 115 shows a $V_2(a_{-1})$ memory; 121 refers to an address control circuit; 122 signifies a signal combiner; 131 indicates a change block address $b_1$ detector; 141 designates a $(b_1-a_0)$ counter; 151, 152 and 153 identify decoders respectively corresponding to the vertical mode, the horizontal mode (1) and the horizontal mode (2); 161 denotes an adder; 171, 172 and 173 represent gate circuits; 181 shows line buffers; 182 refers to a block separator; and 191 signifies an output terminal. The number of the line buffers 181 prepared is the same as the number of the line buffers 91 used in the coding apparatus. For convenience of description, a memory shift pulse circuit and timing clock pulses, which are not related directly to the circuit operation, are not shown.

Next, a detailed description will be given of the arrangement and the operation of this embodiment. The encoded signals of one line provided from the input terminal 101 are once loaded in the input buffer memory 102. At this time, the decoded contents stored in the decoding line memory 112 are transferred to and stored in a line buffer (1) of 181 and, at the same time, it is converted by the block separator 182 into a binary signal for output from the output terminal 191. Furthermore, at this time, the contents stored in the line buffers (1) and (2) of 181 are respectively transferred to and stored in the next stage line buffers and the contents stored in the line buffer (3) are transferred to the reference line memory 111 for storage therein and, at the same time, a signal of "0" is stored in the $V_2(a_{-1})$ memory 115.

The mode code identifier 103 reads out a required number of signals from the input buffer memory 102 and decides, from their code words, which one of the vertical mode, the horizontal mode (1) and the horizontal mode (2) is being used for decoding. When the signals are "0001", the mode code identifier 103 decides that the decoding mode is the horizontal mode (1), and provides an output "1" on a line $h_1$; when the signals are "001", it decides that the decoding mode is the horizontal mode (2), and provides an output of "1" on a line $h_2$; and when the signal are any one of "0000010", "000010", "010", "1", "011", "000011" or "0000011", it decides that the decoding mode is the vertical mode, and provides an output of "1" on a line V. The address control circuit 121, when receiving the signal "1" from the line V, applies pulses to the reference line memory 111 so that it shifts its stored contents of individual blocks from the address $a_0$ received from a line $P_{113}$ and outputs them, block by block, to the change block address $b_1$ detector 131. The $V_1(a_0)$ memory 114 is a memory having a storage capacity of one block and loads thereinto the value $V_1(a_0)$ from the reference line memory 111 when the address $a_0$ is set in the address control circuit 121. The change block address $b_1$ detector 131 compares the block value received from the reference line memory 111 and the block value received therefrom immediately before it, and produces a signal "0" or "1" depending on whether they are equal to each other or not. The $b_1-a_0$ counter 141 increments its counted contents by one upon each reception of a signal from the address control circuit 121 after the time of the address control circuit 121 receiving the signal "1" from the line V, and, upon reception of the signal "1" from the change block address $b_1$ detector 131, the counter 141 stops the incremental counting operation and outputs its counted contents "$b_1-a_0$" to the adder 161. The $a_1-b_1$ decoder 151, when supplies with the signal "1" from the line V, obtains an address of $a_1$ for $b_1$ from the signal received from the input buffer memory 102 and provides the thus obtained address to adder 161. The adder 161 adds the output "$a_1-b_1$" of the $a_1-b_1$ decoder 151 the output "$b_1-a_0$" of the $b_1-a_0$ counter 141 to obtain the address "$a_1-a_0$" of $a_1$ for $a_0$, provides it to the gate 173. The gate 173 is opened by the signal "1" from the line V to pass on the signal from the adder 161 to the $a_1-a_0$ decoder 154 and the $a_0$ register 113 as well. The $a_1-a_0$ decoder 154 applies a picture element signal from the line $P_{114}$ to the signal combiner 122 by the number of times indicated by the signal received from the gate 173. The $a_1-a_0$ decoder 152, when receiving the signal "1" from the line $h_1$, obtains "$a_1-a_0$" from the signal received from the input buffer memory 102 and the block signal received from the line $P_{114}$, and provides it via the gate 171 to the $a_0$ register 113 and outputs the signal from the $V_1(a_0)$ memory 114 to the signal combiner 122 by "$a_1-a_0$" times. The $a_1-a_0$ decoder 153, when supplied with the signal "1" from the line $h_1$, obtains an output of "$a_1-a_0$" and a picture element signal of the address $a_0$ on the coding scanning line from the signal received from the input buffer memory 102 and the signal from the line $P_{115}$, and applies the picture element signal to the signal combiner 122 by "$a_1-a_0$" times and, further, provides via the gate 172 to the $a_0$ register 113 a signal representing the value "$a_1-a_0$". The signal combiner 122 receives the output signals of the decoders 152, 153 and 154 and the signal $P_{113}$ of the $a_0$ register 113, performs decoding between the addresses $a_0$ and $a_1$ and provides the decoded output to the coding line memory 12. The $V_2(a_{-1})$ memory 115 receives and stores the block value between the addresses $a_0$ and $a_1$.

In the abovesaid decoding circuit, the reset conditions of the counters and the detectors are not referred to nor are they illustrated for the sake of simplicity but it is assumed that the change block address $b_1$ detector 131 and the $a_0-b_1$ counter 141 are reset upon each new setting of the address $a_0$.

While in the foregoing the mode codes, the codes indicating the run lengths and the codes indicating the values of blocks are exemplified in Tables 1, 2 and 3, respectively, the system of the present invention is not limited specifically to such codes but may also be applied with other codes.

The coding efficiency is further improved through utilization of a code table as will be described below. A train of blocks (4n−3)th (n being a natural number) from a first line of a picture is generically called an L1 line in this specification. Similarly, block trains (4n−2)th, (4n−1)th and 4th (n being a natural number) from the first line of the picture are generically called L2, L3 and L4 lines, respectively. Block trains obtained by the binary coding of an original picture through the use of the dither matrix shown in FIG. 1 have such features (1), (2) and (3) as follows:

(1) In the L1 line a block value "5" is apt to occur but block values "8" to "15" do not occur at all.

(2) In the L2 and L4 lines a block value "10" is readily yielded but the block value "5" is difficult to occur.

(3) In the L3 line the block value "5" readily occur but the block value "10" is difficult to occur.

The utilization of the abovesaid features will further enhance the coding efficiency. Then, it is also possible to employ such a system in which a block run length code table and a block value code table, such as Tables 2 and 3, are prepared for each of the L1 to L4 lines and, at the time of encoding the block run length $a_1-a_0$ and the block value $V_1(a_0)$ in the horizonal mode 1 and the horizontal mode 2, it is tested which one of the L1 to L4 lines the coding line belongs to, thereby to select the code tables for each coding line.

Besides, while in the foregoing the following condition $$|a_2-b_2| \leq 3 \text{ and } V_1(a_0) = V_2(a_0)$$

is used for the coding in the vertical mode, it is also possible to employ other conditions such, for instance, as follows:

$$|a_2-b_2| \leq m \text{ and } V_1(a_0) = V_2(a_0)$$

where m is zero or a positive integer. In this case, the comparator 32 in the coding circuitry shown in FIG. 5B is replaced by a comparator for comparing the absolute value "$|(a_2-b_2)|$" of the contents of the $a_2-b_2$ counter 22 with "m".

With the abovesaid coding system, coding in the vertical mode is the most efficient. Then, it can also be adopted to increase the number of times of coding in the vertical mode and to add a mode called a pass mode for further enhancement of the coding efficiency.

FIGS. 7, 8, 9 and 10 are explanatory of specific examples of such coding, such small frame showing a block newly obtained by grouping together binary picture elements and the value in the frame showing the value of the block. Let it be assumed here that each block has possible values of 16 levels (0 to 15). First, addresses $a_0$, $a_{-1}$, $b_1$ and $b_2$ of change blocks are defined as follows: (See FIG. 7.)

$a_0$: Address of a block, on a coding line, with which coding starts.

$a_{-1}$: Address of a change block immediately preceding the block of the address $a_0$, that is, $a_{-1} = a_0 - 1$.

$a_1$: Address of a change block which occurs after the block of the address $a_0$ on the coding line.

$b_1$: Address of a change block which occurs on a reference line after a block of the position just above the block of the address $a_0$.

$b_2$: Address of a change block which occurs immediately after the block of the address $b_1$ on the reference line.

For the sake of brevity, $V_1(x)$ and $V_2(x)$ and (y-z) are defined as follows:

$V_1(x)$: Value of a block at a position x on the reference line.

$V_2(x)$: Value of a block at a position x on the coding line.

$y-z$: Address of y relative to the address of z. In this case, x, y and z may assume the values of the addresses $a_0$, $a_{-1}$, $a_1$ and $b_1$, $b_2$.

The address and the value of each change block on the coding line are coded by the following procedures:

(a) The addresses $a_1$ and $b_1$ of the change blocks are obtained.

(b) In case of $|a_1-b_1| \leq 3$ and $V_1(a_0) = V_2(a_0)$ (See FIG. 7):

When this condition is satisfied, it is determined to perform the coding in the vertical mode and code words are allocated according to the value of $a_1-b_1$. For instance, in such a case as shown in FIG. 7, since $a_1-b_1=2$, the block is coded into "000011" as shown in Table 5.

The address $a_0$ is shifted to the position of the address $a_1$.

(c) In case of $(a_1-b_1) > 0$, $V_1(b_1) = V_2(a_0)$ and $|(a_1-b_2)| > 3$ (see FIG. 8):

When this condition is fulfilled, it is determined to perform coding in the pass mode and mode code words indicating this mode is allocated. For example, in such a case as shown in FIG. 8, the block is coded into "001" as shown in Table 5.

The address $a_0$ is shifted to the position of the address $b_1$.

(d) In case of the conditions of (a) and (b) being not satisfied, any one of coding modes is selected in accordance with the following conditions:

(d-1) In case of $V_1(a_0) = V_2(a_0)$ (see FIG. 9):

When this condition holds, it is determined to carry out coding in the horizontal mode 1, and mode code words indicating this mode and code words $D_{V_1(a_0)}(a_1-a_0)$ indicating a run length $a_1-a_0$ are allocated. For example, in such a case as shown in FIG. 9, the mode code words indicating the horizontal mode 1 are "010" as shown in Table 5 and the code words indicating the run length $a_1-a_0$ are "11111" as shown in Table 2; therefore, the block is coded into "01011111".

TABLE 5

| Mode | Element to be coded | | Code |
|---|---|---|---|
| Pass mode | $(a_1 - b_1) > 0$ and $V_1(b_1) = V_2(a_0)$ and $|(a_1 - b_2)| \leq 3$ | | 001 |
| Vertical mode | $|a_1 - b_1| \leq 3$ and | $a_1 - b_1 = -3$ | 0000010 |
| | | $a_1 - b_1 = -2$ | 000010 |

TABLE 5-continued

| Mode | Element to be coded | | Code |
|---|---|---|---|
| | $V_1(a_0) =$ | $a_1 - b_1 = -1$ | 00010 |
| | $V_2(a_0)$ | $a_1 - b_1 = 0$ | 1 |
| | | $a_1 - b_1 = 1$ | 00011 |
| | | $a_1 - b_1 = 2$ | 000011 |
| | | $a_1 - b_1 = 3$ | 0000011 |
| Horizontal mode 1 | In the case of coding in | $V_1(a_0) = V_2(a_0)$ | $010 + D_{V1(a0)}(a_1 - a_0)$ |
| Horizontal mode 2 | vertical and pass modes being impossible | $V_1(a_0) = V_2(a_0)$ | $011 + P_{V2(a-1)}(V_2(a_0)) + D_{V2(a0)}(a_1 - a_0)$ |

The address $a_0$ is shifted to the position of the address $a_1$.

(d-2) In case of $V_1(a_0) \neq V_2(a_0)$ (see FIG. 10):

When this condition holds, it is determined to perform coding in the horizontal mode 2, and mode code words indicating this mode, code words $P_{V1(a-1)}(V_2(a_0))$ indicating the value of $V_2(a_0)$ and code words $D_{V2(a0)}(a_1 - a_0)$ indicating the run length $a_1 - a_0$ are allocated. For example, in such a case as shown in FIG. 10, the code words indicating the horizontal mode 2 are "011" as shown in Table 5, the code words indicating the value of $V_1(a_0)$ are "11101" as shown in Table 3 and the code words indicating the run length $a_1 - a_0$ are "11111" as shown in Table 2; consequently, the block is coded into "0111110111111".

(e) The address $a_0$ is shifted to the address $a_1$.

The coding takes place following the abovesaid procedure starting with the start picture element of the coding line.

According to the present invention, though not defining the substance of the invention, the coding is carried out assuming, as a critical condition, that a first line is preceded by four lines with all block values being "0", that a first block of each line is preceded by a block having the block value "0", and that a terminating block of each line is vertually followed by a change block.

A description will be given of an example of apparatus for achieving the principle of the present invention in case of employing the pass mode.

Figure 11:
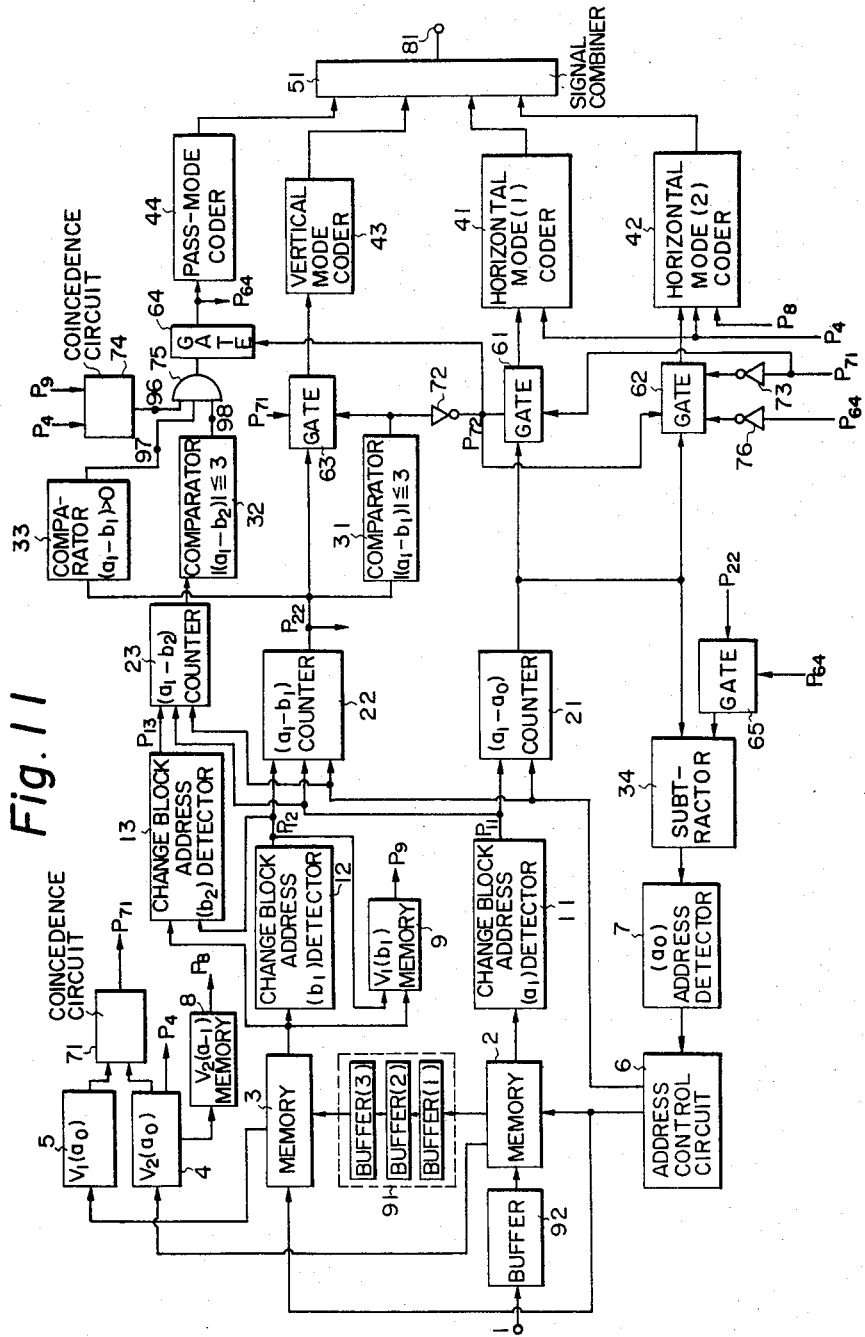
FIG. 11 is a block diagram explanatory of another embodiment of coding according to the present invention.

FIG. 11 illustrates, by way of example, a coding apparatus. Reference numeral 1 indicates a two-level facsimile signal input terminal; 2 and 3 designate memories for storing signals of one scanning line (hereinafter referred to as a "line"), respectively, the memory 2 storing information of a coding line and the memory 3 storing information of a reference line; 4 identifies a memory for one block which stores the value $V_2(a_0)$ of a starting block on the coding line; 5 denotes a memory for one block which stores the value $V_1(a_0)$ of a starting block on the reference line; 6 represents an address control circuit for controlling an operation of reading out the contents of the coding line memory 2 and the reference line memory 3 on a blockwise basis; 7 shows an address register indicating the position of the address $a_0$; 8 refers to a memory for one block which stores the picture element value $V_2(a_{-1})$; 9 signifies a memory for one block which stores the block value $V_1(b_1)$; 11, 12 and 13 indicate a change block address $a_1$ detector, a change block address $b_1$ detector and a change block address $b_2$ detector for detecting the change block addresses from the information of the coding line and the information of the reference line; 21, 22 and 23 designate counters for counting the values $(a_1 - a_0)$, $(a_1 - b_1)$ and $(a_1 - b_2)$, respectively; 31, 32 and 33 identify comparators for comparing the absolute value of the contents of the counters 21, 22 and 23 with respective predetermined threshold values; 34 denotes a subtractor; 41, 42, 43 and 44 represent coders corresponding to the horizontal mode 1, the horizontal mode 2, the vertical mode, and the pass mode respectively; 51 shows a signal combiner; 61, 62, 63, 64 and 65 refer to gates; 71 signifies a coincidence circuit for detecting coincidence between the values $V_1(a_0)$ and $V_2(a_0)$; 74 indicates a coincidence circuit for detecting coincidence between the values $V_1(b_1)$ and $V_2(a_0)$; 72, 73 and 76 designate NOT circuits; 75 identifies an AND circuit; 81 denotes an output terminal; 91 represents line buffers; and 92 shows a block forming buffer.

The storage capacity of the line buffer 91 in this embodiment is determined in dependence on which one of the lines preceding the coding line is selected as the reference line. In this embodiment the line which has the highest correlation to the coding line is shown to be a fourth one of the lines preceding it, and the storage capacity of the line buffer 91 is prepared for three lines.

For the sake of simplicity, a memory shift pulse circuit and timing clock pulses, which are not related directly to the circuit operation in this embodiment, are omitted.

Next, a detailed description will be given of the arrangement and the operation of this embodiment. The contents of the coding line are applied from the terminal 1 to the block forming buffer 92, wherein they are consolidated into blocks, and they are stored in the line memory 2 in a sequential order. At this time, the coded contents of the previous line stored in the line memory 2 are transferred to a line buffer (1) for storage therein and the contents previously transferred from the line buffer (1) and stored in a line memory (2) are transferred to a line buffer (3) for storage therein and, further, the contents stored previously in the line buffer (3) are transferred to the reference line memory 3 for storage therein. Furthermore, at this time, the address $a_0$ of the coding start point on the coding line is stored in the $a_0$ address register 7 and the address $a_0$ is also set as an initial value in the address control circuit 6. Consequently, the values $V_1(a_0)$ and $V_2(a_0)$ are read out from the line memory 2 and the reference line memory 3, respectively, and stored in the $V_1(a_0)$ and $V_2(a_0)$ memories 5 and 4. At this time, the contents of the $V_2(a_{-1})$ memory 8 are "0". The contents of the line memory 2 and the reference line memory 3 are simultaneously read out, block by block, by the count-up operation of the address control circuit 6 in a sequential order by starting with the address $a_0$.

The change block address $a_1$ detector 11 compares the block value transferred from the line memory 2 with the block value transferred therefrom immediately before and provides an output of "0" or "1" on a line $P_{11}$ depending on whether they are equal to each other or not.

The coincidence circuit 71 compares the contents of the $V_2(a_0)$ memory 4 and the $V_1(a_0)$ memory 5 and provides an output of "1" or "0" on a line $P_{71}$ depending on whether they are equal to each other or not. The change block address $b_1$ detector 12 compares the block value received from the reference line memory 3 with the block value received therefrom immediately before, and provides an output of "0" or "1" on a line $P_{12}$ depending on whether they are equal to each other or not.

The $V_1(b_1)$ memory 9, when receiving the signal "1" from the line $P_{12}$, stores the block value transferred from the reference line memory 3.

The $(a_1-b_1)$ counter 22 is provided to count a distance between the change block addresses $a_1$ and $b_1$ and starts the counting operation by an earlier one of the signals on the lines $P_{11}$ and $P_{12}$ and stops the counting operation by the other signal applied afterwards. At this time, if the signal on the line $P_{12}$ is applied earlier, the counted contents of the counter 22 are incremented one by one in synchronism with signals from the address control circuit 6, whereas if the signal on the line $P_{11}$ is applied earlier, the count contents of the counter 22 are decremented one by one. By this, the distance between the addresses $a_1$ and $b_1$ is obtained with a sign ($\pm$). Incidentally, when signals "1" are concurrently applid from the lines $P_{11}$ and $P_{12}$, the counter 22 generates an output of "0" as the value of $(a_1-b_1)$.

The change block address $b_2$ detector 13 states its operation at the time of receiving the signal "1" from the line $P_{12}$, and compares a block value transferred from the reference line memory 3 with a block value transferred therefrom immediately before it and provides an output of "0" or "1" on a line $P_{13}$ depending on whether they are equal to each other or not.

The $(a_1-b_2)$ counter 23 is provided to count a distance between the change block addresses $a_1$ and $b_2$, and starts the counting operation by an earlier one of the signals "1" from the lines $P_{11}$ and $P_{13}$ and stops the counting operation by the other signal "1" applied afterwards. At this time, if the signal from the line $P_{13}$ is earlier, then the counted contents of the counter 23 are incremented one by one in synchronism with signals from the address control circuit 6, whereas if the signal from the line $P_{11}$, then the counted contents of the counter 23 are decremented one by one in synchronism with the signals from the address control circuit 6. Incidentally, when supplied with signals "1" from the lines $P_{11}$ and $P_{13}$ at the same time, the counter produces an output of "0" as the value of $(a_1-b_2)$.

The comparator 32 tests whether or not the absolute value $|(a_1-b_1)|$ of the contents of the $(a_1-b_2)$ counter 22 are smaller than "3", and yields a "1" or "0" depending on whether the absolute value falls inside the above-said range or not.

The comparator 33 examines whether or not the contents of the $(a_1-b_1)$ counter 22 are larger than "0", and produces an output of "1" or "0" depending on whether it is larger than "0" or not.

The coincidence circuit 74 compares the contents of the $V_2(a_0)$ memory 4 with the $V_1(b_1)$ memory 9, and generates an output of "1" or "0" depending on whether they are equal to each other or not. The AND circuit 75 produces an output of "1" or "0" on a line $P_{15}$ depending on whether or not signals from the comparators 32 and the coincidence circuit 74 are all "1".

The comparator 31 examines whether the absolute value $|(a_1-b_1)|$ is smaller than "3", and outputs an output of "1" or "0" depending on whether it falls within this range or not.

The gate 63 is opened by the signals from the line $P_{71}$ and the comparator 32. That is to say, it is opened when the conditions $V_1(a_0)=V_2(a_0)$ and $|a_1-b_1|\leq 3$ are fulfilled and the contents of the $(a_1-b_1)$ counter 22 are coded by the vertical mode coder 43.

The NOT circuit 72 produces an output of "1" or "0" on a line $P_{12}$ depending on whether the output of the comparator 31 assumes a state "0" or "1". The gate 64, when receiving the signal "1" from the line $P_{12}$, is opened to transfer therethrough the output of the AND circuit 75 to the pass mode coder 44.

The pass mode coder 44, when received an output of "1" from the AND circuit 75, provides a pass mode code to the signal combiner 51.

The $(a_1-a_0)$ counter 21 starts its counting operation at the time of the address control circuit 6 setting therein the address $a_0$ and increments its contents one by one receiving signals from the address control circuit 6 and stops the counting operation at the time when it receives the signal "1" from the line $P_{11}$.

The gate 61 is opened when the output from the comparator 32 assumes the state "0" and the signal on the line $P_{71}$ assumes the state "1", that is, when $V_1(a_0)=V_2(a_0)$ and $|(a_1-b_1)|>3$. This is the condition for the horizonal mode (1). The horizontal mode (1) coder 41 encodes the value of $(a_1-a_0)$ provided thereto via the gage 61 on the basis of the value $V_2(a_0)$ applied via the line $P_4$.

The gate 62 is opened when the comparator 32 produces an output of "0" and the signal on the line $P_{71}$ assumes the state "0", that is, it is when the mode of operation is the horizontal mode 2 in which the coding cannot be effected in the pass mode and, further, $V_1(a_0)\neq V_2(a_0)$ and $|(a_1-b_1)|>3$.

The horizontal mode (2) coder 42 encodes the value $V_2(a_0)$ applied from the line $P_4$ on the basis of the value $V_2(a_{-1})$ from the line $P_8$, and encodes the value $(a_1-a_0)$ applied via the gate 62 on the basis of the value $V_2(a_0)$.

The signal combiner 51 combines the encoded signals from the coders 41, 42 and 43 into a train of signals, which are provided to the output terminal 81.

When receiving a signal of "1" from a line $P_{64}$, the gate 65 opens to pass a signal on a line $P_{22}$, that is, "$(a_1-b_1)$", to the subtractor 34.

The subtractor 34, when supplied with the signal "$(a_1-b_1)$" from the gate 65, subtracts the value of the signal from the output "$(a_1-a_0)$" of the $(a_1-a_0)$ counter 21 to obtain a value "$(b_1-a_0)$", which is applied to the address register 7. In the absence of the signal from the gate 65, the subtractor 34 provides the output $(a_1-a_0)$ of the $(a_1-a_0)$ counter 21 to the address register 7.

The $a_0$ address register 7 receives and adds the content of the $(a_1-a_0)$ counter 21 to its contents to obtain a new address $a_0$.

Thereafter the contents of the $V_2(a_0)$ memory 4 are stored in the $V_2(a_{-1})$ memory 8, and values $V_2(a_0)$ and $V_1(a_0)$ are respectively read out from the memories 2 and 3 and stored in the $V_2(a_0)$ memory 4 and the $V_1(a_0)$ memory 5.

In the foregoing, for the sake of brevity, reset conditions of the counters and the detectors are not referred to nor are they shown in the drawings. Let it be assumed that the change block address detectors 11, 12 and 13 and the counters 21, 22 and 23 are reset upon each new setting of the address $a_0$.

Figure 12:
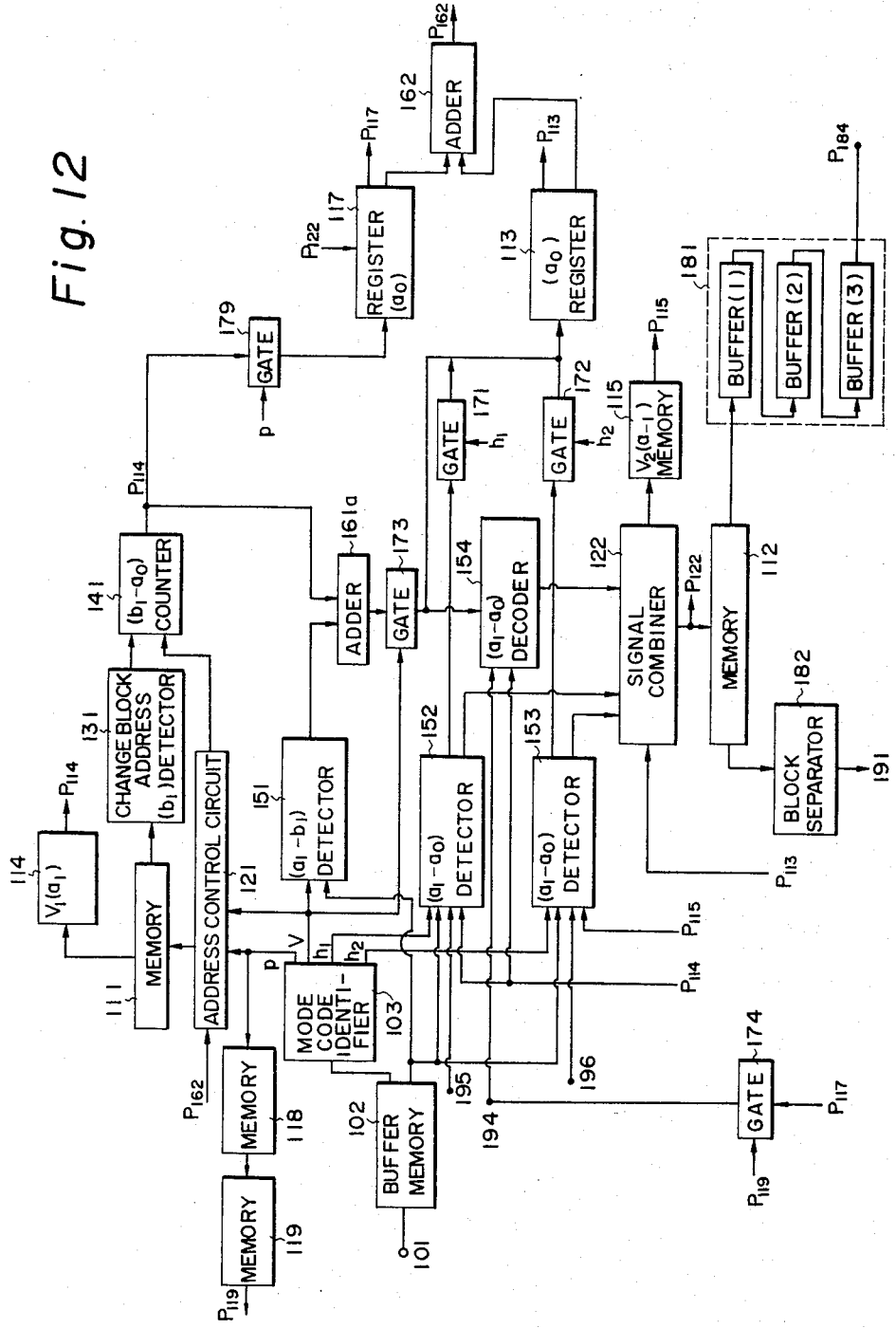
FIG. 12 is a block diagram illustrating an example of a decoding apparatus for a facsimile signal coded by the embodiment of FIG. 11.

The above is a description of the operation of the coding apparatus and decoding is carried out by reversing the order of the operations described above. FIG. 12 illustrates an example of a decoding circuitry. Reference numeral 101 indicates a coded signal input terminal; 102 designates an input buffer memory; 103 identifies a mode code identifier; 111 and 112 denote a decoding line memory and a reference line memory, respectively; 113 represents an $a_0$ register; 114 shows a $V_1(a_0)$ memory; 115 refers to a $V_2(a_{-1})$ memory; 117 signifies an $a_1$ register for the pass mode; 118 indicates a pass mode memory a; 119 designates a pass mode memory b; 121 identifies an address control circuit; 122 denotes a signal combiner; 131 represents a change block address $b_1$ detector; 141 shows an $(a_0-b_1)$ counter; 151, 152 and 153 refer to decoders respectively corresponding to the vertical mode, the horizontal mode (1) and the horizontal mode (2); 161 and 162 signify adders; 171, 172, 173, 174 and 179 indicate gate circuits; 181 designates line buffers; 182 identifies a block separator; and 191 signifies an output terminal. The number of the line buffers 181 prepared is the same as the number of the line buffers 91 used in the coding apparatus. In this example, the line buffers are prepared for three lines. For convenience of description, a memory shift pulse circuit and timing clock pulses, which are not related directly to the circuit operation, are not shown.

Next, a detailed description will be given of the arrangement and the operation of this embodiment. The encoded signals of one line provided from the input terminal 101 are once loaded in the input buffer memory 102. At this time, the decoded contents stored in the decoding line memory 112 are transferred to and stored in a line buffer (1) of 181 and, at the same time, it is converted by the block separator 182 into a binary signal for output from the output terminal 191. Furthermore, at this time, the contents stored in the line buffers (1) and (2) in 181 are respectively transferred to and stored in the next stage line buffers and the content stored in the line buffer (n−1) is transferred to the reference line memory 111 for storage therein. At the same, a "0" is stored in each of the $V_2(a_0)$ memory 115 and the $a_0$ register 117 for the pass mode.

The mode code identifier 103 reads out a required number of signals from the input buffer memory 102 and decides, from their code words, which one of the vertical mode, the horizontal mode (1) and the horizontal mode (2) is used for coding. When the signals are "001", the mode code identifier 103 decides that the coding mode is the pass mode, and produces on a line p and output "1" and if not, an output "0"; when the signals are "010", it decides that the coding mode is the horizontal mode (1), and produces an output "1" on a line $h_1$; when the signals are "011", it decides that the coding mode is the horizontal mode (2), and produces an output "1" on a line $h_2$; and when the signals are "0000010", "000010", "00010", "1", "00011", "000011" or "0000011", it decides that the coding mode is the vertical mode, and produces an output "1" on a line V. The pass mode memory a 118 stores the signal from the line p. At this time, the content of the pass mode memory a 118 is transferred to and stored in the pass mode memory b 119. The address control circuit 121, when receiving the signal "1" from the line V or p, applies pulses to the reference line memory 111 so that it shifts its stored contents of individual blocks from the address $a_0$ received from a line $P_{162}$ and outputs them, block by block, to the change block address $b_1$ detector 131. The $V_1(a_0)$ memory 114 is a memory having a storage capacity of one block and loads thereinto the value $V_1(a_0)$ from the reference line memory 111 when the address $a_0$ is set in the address control circuit 121. The change block address $b_1$ detector 131 compares the block value received from the reference line memory 111 with the block value received therefrom immediately before it, and generates a signal of "0" or "1" depending on whether they are equal to each other or not. The $a_0-b_1$ counter 131 increments its counted contents by one upon each reception of a signal from the address control circuit 121 after the time of the address control circuit 121 receiving the signal "1" from the line V or p, and, upon reception of the signal "1" from the change block address $b_1$ detector 131, the counter 141 stops the incremental counting operation and outputs its counted contents "$b_1-a_0$" on a line $P_{114}$. When supplied with a "1" from the line P, the gate 179 opens and outputs the signal "$b_1-a_0$" on the line $P_{114}$ to the $a_0$ register 117 for the pass mode. The $a_0$ register 117 for the pass mode adds to its stored contents the signal "$b_1-a_0$" received from the gate 179 and provides it on a line $P_{117}$. The $a_1-b_1$ decoder 151, when supplied with the signal "1" from the line V, obtains an address $a_1$ relative to the address $b_1$ from the signal received from the input buffer memory 102 and provides the thus obtained address to the adder 161. The adder 161 adds the output "$a_1-b_1$" of the $a_1-b_1$ decoder 151 and the output "$a_1-b_1$" of the $a_0-b_1$ counter 141 to obtain the address $a_1$ relative to the address $a_0$, "$a_1-a_0$", and provides it to the gate 173. The gate 173 is opened by the signal "1" from the line V to pass on the signal from the adder 161 to the $a_1-a_0$ decoder 154 and the $a_0$ register 113 as well. The gate 174 is opened by a "1" from a line $P_{119}$ and provides the signal of the line $P_{117}$ to the $a_1-a_0$ decoder 154. The $a_1-a_0$ decoder 154, when not supplied with a signal from the gate 174, applies a block signal from the line $P_{114}$ to the signal combiner 122 by the number of times indicated by the signal received from the gate 173 and, when supplied with a signal from the gate 174, the decoder 154 applies the signal from the gate 174 to the signal combiner 122 by the number of times indicated by a signal which is composite signal of the signal received via the gate 173 and the signal received from the gate 174. The $a_1-a_0$ decoder 152, when receiving the signal "1" from the line $h_1$, obtains "$a_1-a_0$" from the signal received from the line $P_{114}$, and provides it via the gate 171 to the $a_0$ register 113 and outputs the signal from the $V_1(a_0)$ memory 114 to the signal combiner 122 by "$a_1-a_0$" times. The $a_1-a_0$ decoder 153, when supplied with the signal "1" from the $h_1$, obtains "$a_1-a_0$" and a picture element signal of the address $a_1$ on the coding line by the use of the signal received from the input buffer memory 102 and a signal from the line $P_{115}$, and applies the picture element signal to the signal combiner 122 by "$a_1-a_0$" times and, further, provides via the gate 172 to the $a_0$ register 113 a signal representing the value "$a_1-a_0$". The signal combiner 122 receives the output signals of the decoders 152, 153 and 154 and the signal $P_{113}$ of the $a_0$ register 113, performs decoding between the addresses $a_0$ and $a_1$ and provides the decoded output to the coding line memory 112. The $V_2(a_{-1})$ memory 115 receives the block value between the addresses $a_0$ and $a_1$ from the coded line memory 112 and stores it. The $a_0$ register 117 for the pass mode makes it stored contents "0" when receiving a signal from the signal combiner 122. The $a_0$ register 113 adds the signals from the gates 172 and 173 to its stored contents and stores them. The adder 162 adds the contents of the $a_0$ register 113 and the $a_0$ register 117 for the pass mode and provides the added output on a line $P_{162}$.

In the abovesaid decoding circuit, the reset conditions of the counters and the detectors are not referred to nor are they illustrated for the sake of simplicity, but it is assumed that the change block address $b_1$ detector 131 and the $a_0-a_1$ counter 141 are reset upon each new setting of the address $a_0$.

While in the foregoing the mode codes, the codes indicating the run lengths and the codes indicating the values of blocks are exemplified in Tables 5, 2 and 3, respectively, the system of the present invention is not limited specifically to such codes but may also be applied with other codes.

The coding efficiency is further improved through utilization of code tables as will be described hereinbelow. A block line (4n−3)th (n being a natural number) from a first line of a picture is generically called an L1 line. Similarly, block lines (4n−2), (4n−1) and 4nth (n being a natural number) from the first line of the image are generically called L2, L3 and L4 lines, respectively. The block lines obtained by binary coding of an original image through using the dither matrix shown in FIG. 1 have such features (1), (2) and (3) as follows:

(1) In the L1 line a block value "5" readily occurs but block values "9" to "15" do not ever occur.

(2) In the L2 and L4 lines the block value "10" is apt to occur but the block value "5" is difficult to occur.

(3) In the L3 line the block value is apt to occur but the block value "10" is difficult to occur.

The utilization of the abovesaid features will further enhance the coding efficiency. Then, it is also possible to apply such a system in which a block run length code table, such as Table 2, and a block value code table, such as Table 3, are prepared for each of the L1 to L4 lines and, at the time of coding the block run length $a_1-a_0$ and the block value $V_2(a_0)$ in the horizontal mode 1 and the horizontal mode 2, it is tested which one of the L1 to L4 lines the coding line belongs to, thereby to select the code table for each coding line.

While in the foregoing $|a_2-b_2| \leq 3$ and $V_1(a_0)=V_2(a_0)$ are used as the condition for the vertical mode, it is also possible to employ other conditions, such as, for instance, as follows:

$$|a_2-b_2| \leq m \text{ and } V_1(a_0)=V_2(a_0)$$

where m is zero or a positive integer. In this case, the comparator 31 in the coding circuit of FIG. 11 is replaced by a comparator for comparing the absolute value "$|(a_2-b_2)|$" of the contents of the $a_2-b_2$ counter 22 with "m".

Moreover, although the condition for encoding in the pass mode is described to be $(a_1-b_1)>0$, $V_1(a_0)=V_2(a_0)$ and $|(a_1-b_2)| \leq 3$, other conditions may also be used, which are such, for example, as follows:

(i) $(a_1-b_1)>0$, $V_1(b_1)=V_2(a_0)$ and $|(a_1-b_2)| \leq m$
(ii) $(a_1-b_1)>0$
(iii) $(a_1-b_1)>0$ and $V_1(b_1)=V_2(a_0)$
(iv) $(a_1-b_2)>0$
(v) $(a_1-b_2) \leq 0$ and $V_1(b_1)=V_2(a_0)$ where m has the same value as the m used in the condition for the abovesaid vertical mode.

The condition (i) can be satisfied by replacing the comparator 32 in the coding circuitry of FIG. 11 by a comparator for comparing the absolute value "$|(a_1-b_1)|$" of the contents of the $a_1-b_2$ counter 23 and "m".

The condition (ii) can be fulfilled by opening the coding circuitry at points 96 and 98.

The condition (iii) can be fulfilled by opening the coding circuitry at the point 98.

The condition (iv) can be satisfied by opening the coding circuitry at the points 96 and 97 and substituting the comparator 32 with a comparator which compares the contents "$(a_1-b_2)$" of the $a_1-b_2$ counter 32 with "0" and produces an output of "1" or "0" depending on whether $(a_1-b_2) \leq 0$ or not.

The condition (v) can be satisified by opening the coding circuitry at the point 96 and replacing the comparator 32 by a comparator which compares the content "$(a_1-b_2)$" of the $a_1-b_2$ counter 23 with "0" and produces an output of "1" or "0" depending on whether $(a_1-b_2) \leq 0$ or not.

In the decoding circuitry in the cases of the conditions (ii) to (v), the terminal 191 is connected to a terminals 194 and 195. In such a case, the $a_1-a_0$ decoder 152, when supplied with signal of "1" from the line $h_1$, obtains "$(a_1-a_0)$" by the use of a signal received from the input buffer memory 102 and a block signal received from the line $P_{114}$. When receiving a signal from the gate 174, the decoder 152 obtains a value which is the sum of "$(a_1-a_0)$" and the contents of the received signal, and provides the value via the gate 171 to the $a_0$ register 113 and, at the same time, applies a block value signal of the address $a_0$ from the line $P_{114}$ to the signal combiner 122 by the number of times indicated by the value. Furthermore, in the absence of the signal from the gate 174, the decoder 152 applies "$(a_1-a_0)$" via the gate 171 to the $a_0$ register 113 and, at the same time, provides a block signal of the address $a_0$ from the line $P_{114}$ to the signal combiner 122 by "$(a_1-a_0)$". The $a_1-a_0$ decoder 153, when supplied with a signal of "1" from the line $h_2$, obtains "$(a_1-a_0)$" and a block value of the address $a_0$ by the use of the signal received from the input buffer memory 102 and the block signal received from the line $P_{115}$. In case of receiving a signal from the gate 174, the decoder 153 obtains a value which is the sum of "$(a_1-a_0)$" and the contents of the signal from the gate, and provides the thus obtained value via the gate 172 to the $a_0$ register 113 and, at the same time, it applies the block signal of the address $a_0$ to the code combiner 122 by the number of times indicated by the abovesaid value. In the absence of the signal from the gate 174, the decoder 153 outputs "$(a_1-a_0)$" via the gate 172 to the $a_0$ register 113 and, at the same time, it outputs the block value signal of the address $a_0$ by "$(a_1-b_0)$".

As has been described in the foregoing, the method of the present invention is capable of achieving the intended objects by the arrangements described in detail.

What we claim is:

1. In a coding method for a multilevel-gradated picture signal, comprising the steps of:
   segmenting a series of binary codes obtained by processing a multilevel-gradated original picture signal for binary representation, every predetermined number n of picture elements on each scanning line, so as to form blocks respectively capable of assuming values of "0" to "$2^n-1$"; and encoding the value of a change block having changed its value and its position on the scanning line so as to be reproduced on the reproducing side;

the improvement characterized by said encoding step performed by the use of the following data:

$a_0$: address of a block, on a coding line, with which coding starts;

$a_1$: address of a change block which occurs after the block of the address $a_0$ on the coding line;

$b_1$: address of a change block which occurs on a coded reference line after a block of the position just above the block of the address $a_0$;

$b_2$: address of a change block which occurs immediately after the block of the address $b_1$ on the reference line;

$v_1(x)$: value of a block at a position x on the reference line;

$v_2(x)$: value of a block at a position x on the coding line, said encoding step coding the value $V_2(a_0)$ and the address $a_1$ by coding a relative address of $(a_1-b_1)$ in a Vertical Mode where $v_1(a_0)=v_2(a_0)$ and the relative address of $(a_1-b_1)$ is included in a predetermined range of values;

said encoding step coding the value $v_2(a_0)$ and the address $a_1$ by coding a relative address of $(a_1-a_0)$ in a Horizontal Mode I where $v_1(a_0)=v_2(a_0)$ and the relative address of $(a_1-b_1)$ exceeds the predetermined range of values; and said encoding step coding the value $(v_2(a_0)$ and the address $a_1$ by coding the value $v_2(a_0)$ and the relative address of $(a_1-a_0)$ in a Horizontal Mode II where the value $v_1(a_0)$ is not equal to $v_2(a_0)$, said Vertical Mode, said Horizontal Mode I and said Horizontal Mode II being mutually differentiated from one another by said coding.

2. A coding method for a multilevel-gradated picture signal according to claim 1, further including:

a step of shifting the address $b_2$ to the address $b_1$ in case of a Pass Mode where said Horizontal Mode I and said Horizontal Mode II can be improved to the direction of the Vertical Mode in order to heighten the coding efficiency.

3. A coding method for a multilevel-gradated picture signal according to claim 2, in which said Pass Mode is defined by $(a_1-b_1)>0$, $v_1(b_1)=v_2(a_0)$, and $|a_1-b_2|\leq m$.

4. A coding method for a multilevel-gradated picture signal according to claim 2, in which said Pass Mode is defined by $(a_1-b_1)>0$.

5. A coding method for a multilevel-gradated picture signal according to claim 2, in which said Pass Mode is defined by $(a_1-b_1)0>$ and $v_1(b_1)=v_2(a_0)$.

6. A coding method for a multilevel-gradated picture signal according to claim 2, in which said Pass Mode is defined by $(a_1-b_2)\leq 0$.

7. A coding method for a multilevel-gradated picture signal according to claim 2, in which said Pass Mode is defined by $(a_1-b_2)\leq 0$ and $v_1(b_1)=v_2(a_0)$.

* * * * *